US010826902B1

(12) United States Patent
Aksu et al.

(10) Patent No.: US 10,826,902 B1
(45) Date of Patent: Nov. 3, 2020

(54) INTERNET OF THINGS (IOT) IDENTIFYING SYSTEM AND ASSOCIATED METHODS

(71) Applicant: GOVERNMENT OF THE UNITED STATES AS REPRESENTED BY THE SECRETARY OF THE AIR FORCE, Rome, NY (US)

(72) Inventors: Hidayet Aksu, Eruh (TR); A. Selcuk Uluagac, Dinar (TR); Elizabeth S. Bentley, Clinton, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 247 days.

(21) Appl. No.: 15/909,044

(22) Filed: Mar. 1, 2018

(51) Int. Cl.

| | |
|---|---|
| *G06F 21/56* | (2013.01) |
| *H04L 29/06* | (2006.01) |
| *H04L 12/24* | (2006.01) |
| *H04W 12/06* | (2009.01) |
| *G06N 20/00* | (2019.01) |

(Continued)

(52) U.S. Cl.
CPC ......... *H04L 63/0876* (2013.01); *G06N 20/00* (2019.01); *H04L 41/12* (2013.01); *H04W 12/06* (2013.01); *H04L 67/12* (2013.01); *H04W 4/80* (2018.02)

(58) Field of Classification Search
CPC ..... H04L 63/0876; H04L 41/12; H04L 67/12; G06N 20/00; H04W 12/06; H04W 4/80
See application file for complete search history.

(56) References Cited

U.S. PATENT DOCUMENTS

| | | | |
|---|---|---|---|
| 2017/0262633 A1* | 9/2017 | Miserendino | ......... G06F 21/566 |
| 2018/0139141 A1* | 5/2018 | Stepanek | ............ H04L 47/2475 |

(Continued)

OTHER PUBLICATIONS c) Aksu et al. Sep. 27, 2018. "Identification of Wearable Devices with Bluetooth" Retrieved Mar. 26, 2020 from <https://ieeexplore.ieee.org/stamp/stamp.jsp?tp=&arnumber=8299447&isnumber=7742329&tag=1> (Year: 2018).*

(Continued)

*Primary Examiner* — Shean Tokuta
*Assistant Examiner* — Juan C Turriate Gastulo
(74) *Attorney, Agent, or Firm* — Adam Pugh

(57) ABSTRACT

A wireless Internet-of-Things (IoT) device identification method and framework incorporates machine learning (ML) techniques with information from the protocol used (e.g., Bluetooth, Bluetooth Low Energy/Bluetooth Smart, and others). A passive, non-intrusive feature selection technique targets IoT device captures with an ML classifier selection algorithm for the identification of IoT devices (i.e., picking the best performing ML algorithm among multiple ML algorithms available). Using an input training label and training dataset (e.g., training wireless IoT packets) associated with the IoT device, a classifier and a filter are selected. An inter-arrival-time (IAT) associated with the filtered training data set and a density distribution for the IAT are then calculated. After converting the density distribution to the training feature vector, a prediction model and the selected classifier are stored for subsequent application to testing datasets to detect and display an association of the testing dataset to a matched IoT device (i.e., identification).

20 Claims, 18 Drawing Sheets

(51) Int. Cl.
*H04W 4/80* (2018.01)
*H04L 29/08* (2006.01)

(56) References Cited

U.S. PATENT DOCUMENTS

2019/0042479 A1* 2/2019 Basak ..................... G06F 21/78
2019/0042900 A1* 2/2019 Smith .................... G06K 9/726

OTHER PUBLICATIONS

Arlot et al., "A survey of cross-validation procedures for model selection", Statistics Surveys, Institute of Mathematical Statistics (IMS), Year 2010, vol. 4, pp. 40-79, DOI: 10.1214/09-SS054.

* cited by examiner

502 ⟶

Algorithm 1 Learning Algorithm - Training Phase

Input: $ds$: learning dataset with labels
Output: return pair $<prediction\_model, filter>$ 1: $algs \leftarrow$ [LibSVM, MultilayerPerceptron ... RandomForest]   ▷ list of supported classifiers
2: $filters \leftarrow$ [all-all, all-30, ... LE_LL-65]   ▷ list of supported filters
3: $<alg, f> \leftarrow$ Select Best Classifier and Filter($ds, algs, filters$)
4: $ds_f \leftarrow$ apply filter($ds, f$)
5: $feature\_set \leftarrow$ generate feature vector($ds_f$)
6: $prediction\_model \leftarrow$ build model($feature\_set, alg$)
7: return $<prediction\_model, f>$

Algorithm 2 Select Best Classifier and Filter - Training Phase

Input: $ds$: learning dataset with labels,
$algs$: list of supported ML algorithms,
$filters$: list of filters
Output: return pair $<alg, f>$ best performing algorithm and filter 1: $va \leftarrow$ empty vector
2: $vf \leftarrow$ empty vector
3: for each algorithm $alg$ in $algs$ list do
4:   for each filter $f$ in $filters$ list do
5:     $ds_f \leftarrow$ apply filter($ds, f$)
6:     $feature\_set \leftarrow$ generate feature vector($ds_f$)
7:     $model_{alg} \leftarrow$ build model($feature\_set, alg$)
8:     $accuracy_{f,alg} \leftarrow$ test model($model_{alg}, ds_f$)
9:     add pair $<alg, accuracy_{f,alg}>$ to vector $va$
10:    add pair $<f, accuracy_{f,alg}>$ to vector $vf$
11:  end for
12: end for
13: $va_{top15} \leftarrow$ filter top 15 percent by accuracy($va$)
14: $alg\_freq \leftarrow$ compute frequency per algorithm($va_{top15}$)
15: $alg \leftarrow$ most frequent entry($alg\_freq$)
16: $vf_{top15} \leftarrow$ filter top 15 percent by accuracy($vf$)
17: $filter\_freq \leftarrow$ compute frequency per filter($vf_{top15}$)
18: $filter \leftarrow$ most frequent entry($filter\_freq$)
19: return $<alg, filter>$

Algorithm 3 Generate Feature Vector - Training&Testing Phases

Input: *ds*: dataset
Output: returns feature vector of *ds*

1: *iat* ← *extract inter arrival time(ds)*
2: *dd* ← *generate density distribution(iat)*
3: *features* ← *converts to features(dd)*
4: return *features*

Algorithm 4 Testing Algorithm - Testing Phase

Input: *ds*: testing dataset,
 *prediction_model*: constructed model from learning phase,
 *filter*: chosen filter from learning phase
Output: return predicted *device*

1: $ds_f$ ← *apply filter(ds, filter)*
2: *feature_set* ← *generate feature vector($ds_f$)*
3: *device* ← *model predict(prediction_model, feature_set)*
4: return *device*

FIG. 6B

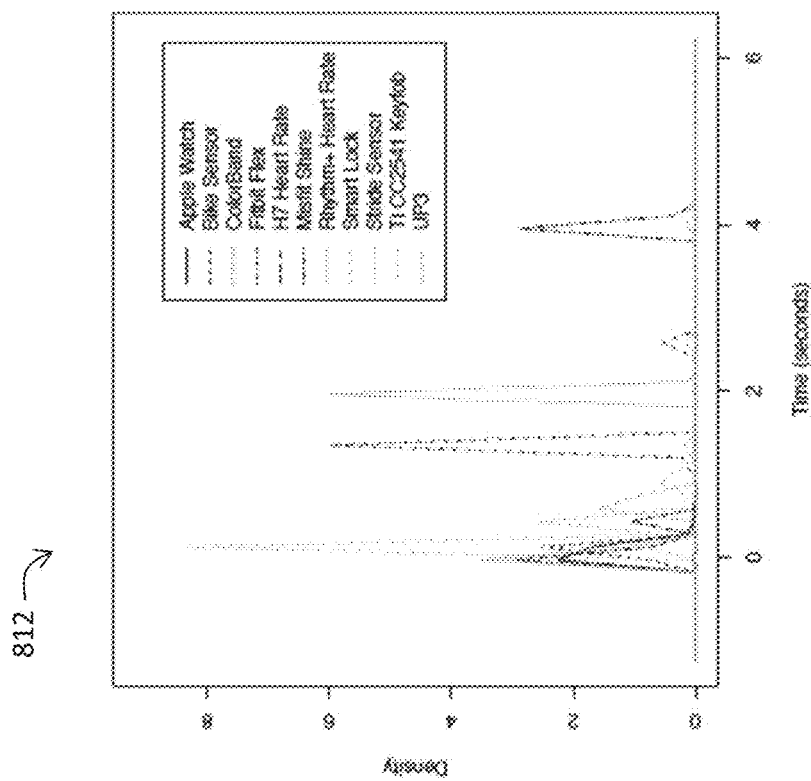
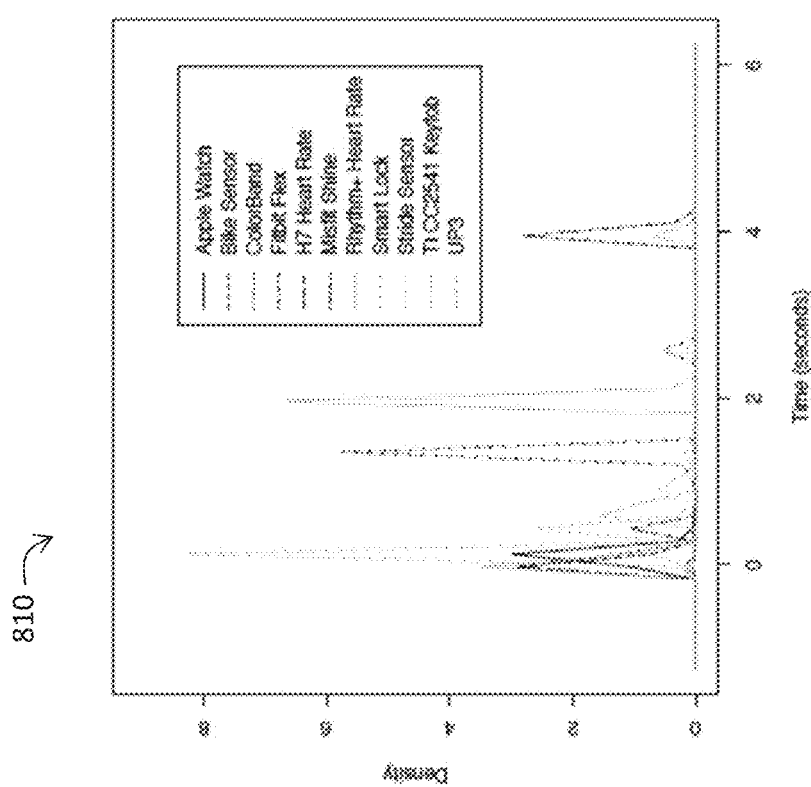
FIG. 8C

FIG. 10A

| Testbed | Filtering Case | Accuracy | Precision | Recall | ROC Area | PRC Area |
|---|---|---|---|---|---|---|
| Smart Tablet | all-44 | 0.947 | 0.955 | 0.947 | 0.999 | 0.995 |
| | LE_LL-44 | 0.947 | 0.955 | 0.947 | 0.997 | 0.988 |
| | LE_LL-37 | 0.924 | 0.937 | 0.924 | 0.998 | 0.988 |
| | all-37 | 0.924 | 0.931 | 0.924 | 0.995 | 0.982 |
| | all-all | 0.865 | 0.890 | 0.865 | 0.982 | 0.925 |
| Smart Phone | all-37 | 0.965 | 0.972 | 0.965 | 0.993 | 0.976 |
| | LE_LL-37 | 0.953 | 0.962 | 0.953 | 0.988 | 0.954 |
| | LE_LL-44 | 0.947 | 0.952 | 0.947 | 0.974 | 0.908 |
| | all-44 | 0.935 | 0.939 | 0.935 | 0.992 | 0.962 |
| | ADV_IND | 0.853 | 0.885 | 0.853 | 0.947 | 0.862 |
| Smart Watch | LE_LL-37 | 0.925 | 0.933 | 0.925 | 0.997 | 0.978 |
| | all-44 | 0.925 | 0.941 | 0.925 | 0.996 | 0.968 |
| | all-37 | 0.920 | 0.932 | 0.920 | 0.995 | 0.963 |
| | ADV_IND | 0.893 | 0.911 | 0.893 | 0.986 | 0.869 |
| | LE_LL-44 | 0.893 | 0.899 | 0.893 | 0.995 | 0.957 |

FIG. 10B

| TP Rate | FP Rate | Precision | Recall | ROC Area | PRC Area | Class |
|---|---|---|---|---|---|---|
| 0.941 | 0.012 | 0.889 | 0.941 | 0.999 | 0.994 | Apple Watch |
| 1.000 | 0.012 | 0.875 | 1.000 | 1.000 | 1.000 | Bike Sensor |
| 0.737 | 0.000 | 1.000 | 0.737 | 0.987 | 0.920 | ColorBand |
| 1.000 | 0.006 | 0.941 | 1.000 | 1.000 | 0.996 | Fitbit Flex |
| 0.867 | 0.000 | 1.000 | 0.867 | 0.998 | 0.977 | H7 Heart Rate |
| 0.882 | 0.029 | 0.750 | 0.882 | 0.982 | 0.884 | Misfit Shine |
| 0.800 | 0.000 | 1.000 | 0.800 | 1.000 | 1.000 | Rhythm+ Heart Rate |
| 1.000 | 0.000 | 1.000 | 1.000 | 1.000 | 1.000 | Smart Lock |
| 1.000 | 0.006 | 0.950 | 1.000 | 1.000 | 1.000 | Stride Sensor |
| 1.000 | 0.012 | 0.917 | 1.000 | 1.000 | 1.000 | TI CC2541 Keyfob |
| 0.923 | 0.006 | 0.923 | 0.923 | 0.999 | 0.990 | UP3 |
| 0.925 | 0.008 | 0.933 | 0.925 | 0.997 | 0.976 | Weighted Avg. |

INTERNET OF THINGS (IOT) IDENTIFYING SYSTEM AND ASSOCIATED METHODS

GOVERNMENT INTEREST

The invention described herein may be manufactured and used by or for the Government of the United States for all governmental purposes without the payment of any royalty.

FIELD OF THE INVENTION

The present invention relates to generally to identification of networked computing devices. More specifically, this invention pertains to systems and methods for identification of Internet of Things (IoT) devices for security and logistics purposes.

BACKGROUND OF THE INVENTION

As described below, automated identification of computing devices that are interconnected via the Internet may serve as a complementary security measure to be used in device authentication and/or access control. The following references, which are not admitted prior art with respect to the present invention by inclusion in this section, are offered as background on the theoretical basis of identification of resource-limited devices:

(1) Vulnerable "smart" devices make an internet of insecure things. (Accessed: Jan. 25, 2016). http://spectrum.ieee.org/riskfactor/computing/networks/vulnerable-smart-devices-make-an-internet-of-insecure-things;
(2) Project ubertooth (2015). http://ubertooth.sourceforge.net;
(3) Java (convolutional or fully-connected) neural network implementation with plugin for weka. uses dropout and rectified linear units (2016). https://github.com/amten/NeuralNetwork;
(4) Arp, D., Spreitzenbarth, M., Hubner, M., Gascon, H., and Rieck, K. (2014). Drebin: Effective and explainable detection of android malware in your pocket. *NDSS*;
(5) Avdiienko, V., Kuznetsov, K., Gorla, A., Zeller, A., Arzt, S., Rasthofer, S., and Bodden, E. (May 2015). Mining apps for abnormal usage of sensitive data. 2015 *IEEE/ACM 37th IEEE International Conference on Software Engineering*, volume 1, pages 426-436;
(6) Bao, T., Burket, J., Woo, M., Turner, R., and Brumley, D. (August 2014). Byteweight: Learning to recognize functions in binary code. 23*rd USENIX Security Symposium (USENIX Security* 14), pages 845-860. USENIX Association, San Diego, Calif.;
(7) Bari, N., Mani, G., and Berkovich, S. (2013). Internet of things as a methodological concept. *Computing for Geospatial Research and Application (COM. Geo)*, 2013 *Fourth International Conference on*, pages 48-55. IEEE;
(8) Brik, V., Banerjee, S., Gruteser, M., and Oh, S. (2008). Wireless device identification with radiometric signatures. *Proc. of the 14th ACM International Conf. on Mobile Computing and Networking (MobiCom)*;
(9) Chakradeo S., Reaves, B., Traynor, P., and Enck, W. (2013) Mast: triage for market-scale mobile malware analysis. *Proceedings of the sixth ACM conference on Security and privacy in wireless and mobile networks*, pages 13-24. ACM;
(10) Danev, B., Zanetti, D., and Capkun, S. (December 2012). On physical-layer identification of wireless devices. *ACM Comput. Surv.*, 45(1):6:1-6:29;
(11) H.-P. Enterprise. (November 2015). Internet of things research study;
(12) Georgios Kakavelakis, R. B. and Young, J. (Dec. 4, 2011). Auto-learning of smtp tcp transport-layer features for spam and abusive message detection, *lisa* 2011, 25th large installation system administration conf.;
(13) Greenough, J. (April 2015). How the 'internet of things' will impact consumers, businesses, and governments in 2016 and beyond;
(14) Hall, J., Barbeau, M., and Kranakis, E. (2006). Rogue devices in bluetooth networks using radio frequency fingerprinting. *IASTED International Conf. on Communications and Computer Networks (CCN)*;
(15) Hall, M., Frank, E., Holmes, G., Pfahringer, B., Reutemann, P., and Witten, I. H. (November 2009). The weka data mining software: An update. *SIGKDD Explor. Newsl.*, 11(1):10-18;
(16) J. Han, M. Kamber, and J. Pe. Data mining: Concepts and techniques: Concepts and techniques;
(17) P. Hu, K. Xing, X. Cheng, H. Wei, and H. Zhu. Information leaks out: Attacks and countermeasures on compressive data gathering in wireless sensor networks. In INFOCOM, 2014 Proceedings IEEE, pages 1258-1266, April 2014;
(18) S. Jana and S. K. Kasera. On fast and accurate detection of unauthorized wireless access points using clock skews. In MobiCom '08: Proc. of the 14th ACM International Conf. on Mobile computing and networking, pages 104-115;
(19) R. Jordaney, Z. Wang, D. Papini, I. Nouretdinov, and L. Cavallaro. Misleading metrics: On evaluating machine learning for malware with confidence. Technical report, Royal Holloway, University of London, 2016;
(20) B. Kang, B. Kang, J. Kim, and E. G. Im. Android malware classification method: Dalvik bytecode frequency analysis. In Proceedings of the 2013 Research in Adaptive and Convergent Systems, RACS '13, pages 349-350, New York, N.Y., USA, 2013. ACM;
(21) B. A. Kohno, Tadayoshi. and K. C. Claffy. Remote physical device fingerprinting. In Proc. of the 2005 IEEE Symposium on Security and Privacy, pages 211-225, Washington, D.C., USA;
(22) J. Z. Kolter and M. A. Maloof. Learning to detect and classify malicious executables in the wild. J. Mach. Learn. Res., 7:2721-2744, December 2006;
(23) A. Kurtz, H. Gascon, T. Becker, K. Rieck, and F. Freiling. Fingerprinting mobile devices using personalized configurations. Proceedings on Privacy Enhancing Technologies, 2016(1):4-19, 2016;
(24) L. Letaw, J. Pletcher, and K. Butler. Host identification via usb fingerprinting. Systematic Approaches to Digital Forensic Engineering (SADFE), 2011;
(25) F. Maggi, S. Zanero, and V. Iozzo. Seeing the invisible: Forensic uses of anomaly detection and machine learning. SIGOPS Oper. Syst. Rev., 42(3):51-58, April 2008;
(26) M. Narouei, M. Ahmadi, G. Giacinto, H. Takabi, and A. Sami. Dllminer: structural mining for malware detection. Security and Communication Networks, 8(18):3311-3322, 2015;
(27) N. Nissim, R. Moskovitch, L. Rokach, and Y. Elovici. Detecting unknowncomputerwormactivityviasupportvectormachinesandactive learning. Pattern Anal. Appl., 15(4):459-475, November 2012;
(28) R. Perdisci, I. Corona, and G. Giacinto. Early detection of malicious flux networks via large-scale passive dns traffic analysis. IEEE Transactions on Dependable and Secure Computing, 9(5):714-726, September 2012;

(29) S. V. Radhakrishnan, A. S. Uluagac, and R. Beyah. Gtid: A technique for physical device and device type fingerprinting. IEEE Transactions on Dependable and Secure Computing, 99(PrePrints):1, 2015;

(30) K. Rieck. Machine learning for application-layer intrusion detection. 2009;

(31) K. Rieck. Computer security and machine learning: Worst enemies or best friends? In SysSec Workshop (SysSec), 2011 First, pages 107-110, July 2011;

(32) K. Rieck, T. Holz, C. Willems, P. Dussel, and P. Laskov. Learning and classification of malware behavior. Detection of Intrusions and Malware, and Vulnerability Assessment, pages 108-125, 2008;

(33) K. Rieck, P. Trinius, C. Willems, and T. Holz. Automatic analysis of malware behavior using machine learning. Journal of Computer Security, 19(4):639-668, 2011;

(34) N. Rosenblum, X. Zhu, B. Miller, and K. Hunt. Learning to analyze binary computer code. In Proceedings of the 23rd National Conference on Artificial Intelligence—Volume 2, AAAI'08, pages 798-804. AAAI Press, 2008;

(35) S. Roy, J. DeLoach, Y. Li, N. Herndon, D. Caragea, X. Ou, V. P. Ranganath, H. Li, and N. Guevara. Experimental study with realworld data for android app security analysis using machine learning. In Proceedings of the 31st Annual Computer Security Applications Conference, ACSAC 2015, pages 81-90, New York, N.Y., USA, 2015. ACM;

(36) M. Ryan. Bluetooth: With low energy comes low security. In Presented as part of the 7th USENIX Workshop on Offensive Technologies, Berkeley, Calif., 2013. USENIX;

(37) M. G. Schultz, E. Eskin, E. Zadok, and S. J. Stolfo. Data mining methods for detection of new malicious executables. In Proceedings of the 2001 IEEE Symposium on Security and Privacy, SP '01, pages 38-, Washington, D.C., USA, 2001. IEEE Computer Society;

(38) R. Sommer and V. Paxson. Outside the closed world: On using machine learning for network intrusion detection. In 2010 IEEE Symposium on Security and Privacy, pages 305-316, May 2010;

(39) G. Stringhini, C. Kruegel, and G. Vigna. Detecting spammers on social networks. In Proceedings of the 26th Annual Computer Security Applications Conference, ACSAC '10, pages 1-9, New York, N.Y., USA, 2010. ACM;

(40) B. Thuraisingham, T. Al-Khatib, L. Khan, M. Masud, K. Hamlen, V. Khadilkar, and S. Abrol. Design and implementation of a data mining system for malware detection. J. Integr. Des. Process Sci., 16(2):33-49, April 2012;

(41) K. Townsend, C. Cuf´t, R. Davidson, et al. Getting started with Bluetooth low energy: Tools and techniques for low-power networking. "O'Reilly Media, Inc.", 2014;

(42) S. Uluagac, S. V. Radhakrishnan, C. L. Corbett, A. Baca, and R. Beyah. A passive technique for fingerprinting wireless devices with wiredside observations. In 2013 IEEE Conference on Communications and Network Security (CNS) (IEEE CNS 2013), pages 471-479, Washington, USA, October 2013;

(43) B. Wolfe, K. Elish, and D. Yao. High precision screening for android malware with dimensionality reduction. In Machine Learning and Applications (ICMLA), 2014 13th International Conference on, pages 21-28, December 2014;

(44) C. Wressnegger, G. Schwenk, D. Arp, and K. Rieck. A close look on n-grams in intrusion detection: anomaly detection vs. classification. In Proceedings of the 2013 ACM workshop on Artificial intelligence and security, pages 67-76. ACM, 2013;

(45) Q. Xu, R. Zheng, W. Saad, and Z. Han. Device fingerprinting in wireless networks: Challenges and opportunities. Communications Surveys Tutorials, IEEE, 18(1):94-104, Firstquarter 2016;

(46) C. Yang, Z. Xu, G. Gu, V. Yegneswaran, and P. Porras. Droidminer: Automated mining and characterization of fine-grained malicious behaviors in android applications. In Computer Security-ESORICS 2014, pages 163-182. Springer, 2014;

(47) Y. Yu, J. Wang, and G. Zhou. The exploration in the education of professionals in applied internet of things engineering. In Distance Learning and Education (ICDLE), 2010 4th International Conference on, pages 74-77, October 2010; and

(48) M. Zhang, Y. Duan, H. Yin, and Z. Zhao. Semantics-aware android malware classification using weighted contextual api dependency graphs. In Proceedings of the 2014 ACM SIGSAC Conference on Computer and Communications Security, CCS '14, pages 1105-1116, New York, N.Y., USA, 2014. ACM.

Internet-of-Things (IoT) is a concept that describes a network of interconnected devices which have advanced capabilities to constantly interact with each other, and also with human beings and their surrounding physical world, to perform automated tasks (7). This interconnection among IoT devices enables them to communicate with each other and with users more efficiently than traditional computing architectures. However, connecting devices with the physical world and each other can lead to proliferation of a large network of IoT devices. Upwards of 30 billion devices may be connected to the Internet by 2020, and more than six trillion dollars are projected to be invested in manufacturing IoT devices that time span (13).

Unfortunately, such proliferation of interconnected devices may pose threats to the security of the devices and to privacy of exchanged information (1). For example, as devices are connected with each other, different types of data breaches, such as information leakage and false data injection, may be initiated in one device of the network to perform unauthorized (and even fraudulent) acts towards another device (17). According to a survey conducted by Hewlett-Packard enterprise in 2015, about 70 percent of total IoT devices use unencrypted network services, 90 percent of devices collect sensitive personal credentials, and 60 percent of the devices have security vulnerabilities on user interface (11). With more IoT devices projected in the near future, security management is expected to become more difficult for such devices. Therefore, security of IoT devices has become a point of concern for researchers and manufacturers. Because IoT devices are mostly resource-limited devices by design (e.g., fitness trackers and smartwatches typically have less battery and processing power compared to a typical computer or smartphone), implementing existing security techniques fully on such architectures may not be feasible.

Meanwhile, machine learning (ML) is increasingly utilized by security community to solve various problems including malware detection (25-27), (37, (43), (46), spammer detection (39), function detection in binaries (6), (34), computer forensics (25), malicious flux networks detection (28), application-layer intrusion detection (30), and network intrusion detection (38). Improvements in algorithms and advancements in computation resources enable ML to become a promising component of security-focused solutions.

Typical IoT devices may be configured to sense the physical environment and share their data with a more resourceful, possibly Internet-connected, device via energy efficient radio protocol. Communication among such IoT devices and the cyber world may be accomplished using wireless IoT protocols, such as Bluetooth Low Energy (BLE) links. The security of an IoT realm cannot be provided without securing this entry point. For example, BLE provides the pairing process, and its security depends on authentication and encryption functions which rely on device address and encryption keys. However, device addresses can be spoofed and encryption keys can be copied to other devices. Eavesdropping, packet injection, and breaking the encryption on a BLE device has been demonstrated in the art (36). In addition to the challenges posed by resource limitation on IoT devices, privacy concerns lead some vendors to hide device unique identifiers (23). Consequently, a need exists for light-weight, non-intrusive device identification in an IoT environment.

As a matter of definition, the following terms may be of significance in describing the present invention:

Machine Learning in Security

Machine learning is widely used in the security field. For example, Naive Bayes have been used to detect malware in windows binaries using DLL list and function calls as a feature (37). Similarly, machine learning techniques have been employed to classify malware (e.g., use of Naive Bayes, Decision Trees, Support Vector Machines, and Boosting to detect malware on Windows executables using n-gram of bytes as the feature) (22). Moreover, a worm detection technique based on support vector machines have been proposed in which twenty (20) features among three-hundred twenty-three (323) monitored computer features are used (27). In addition, an ML-based system has been proposed to detect malware and classify it into existing classes with outlier detection (40). Meanwhile, malware detection with samples from Android Malware Genome project has been studied (20), using Bytecode frequency analysis as the feature with Random Forest algorithm. A decision tree classifier has been proposed to detect and track malicious flux networks (28). Naive Bayes, Support Vector Machine (SVM), Decision Trees and Random Forest have been proposed to identify Android malware (46). Random Forest has been reported to provide the best performance, and that algorithm was used to determine different malware family classes (46). ML-based malware detection, and its critical challenges when ML is used for Android systems, has been explored (4-5), (9), (35, (43), (48). Moreover, machine learning has been proposed in anti-forensics technique detection (25), malware detection (32), (33), application-layer intrusion detection (30), and network intrusion detection (38). N-gram models have been applied in anomaly detection and classification in computer security (44). Difficulties and advantages of ML in computer security are known areas of study (31).

Fingerprinting Devices

Device fingerprinting in networked computing systems is an area of active study in the art. A technique to fingerprint a device remotely via transmission control protocol (TCP) implementation characteristics has been proposed (21), specifically using clock skews which may be inferred from TCP packets timestamp option. Devices may be identified from the pattern of such microscopic deviations. A similar approach employing fingerprints access points using 802.11 beacon frame timestamp has also been proposed (18). Universal Serial Bus timing information of device responses to fingerprint device model, operation system version, and the like have been exploited for identification purposes (24). Physical-layer identification of wireless devices has also been surveyed (10). Electromagnetic characteristics have been exploited for radio frequency (RF) emitter fingerprinting. For example, Bluetooth (14) and Wi-Fi (8) emitter fingerprinting has been used to exploit the variations at electromagnetic characteristics of radio frequency emitters. Doing so, however, has been shown to require expensive hardware. A passive method to fingerprint the devices connected to a WLAN has been proposed (29), (42). A study of mobile device fingerprinting using user-personalized configurations reported up to 97% accuracy over time (23), although the employed technique requires users' active involvement and is not applicable to devices without user personalized configurations. For survey results on fingerprinting mechanisms, see (45).

Internet of Things (IoT) Devices

Certain IoT devices may be equipped with sensors and actuators that connect the device to the physical world. Such devices may be capable of sensing changes in the device's environment and take necessary actions to alter, as needed, execution of the assigned task of the device (47). The ability to sense changes in the physical world, take autonomous actions, and conduct efficient communications with the physical world makes IoT devices advantageously adaptable in different real-world application domains. From personal healthcare monitors to big industrial applications, IoT devices set footsteps in a variety of application domains. Increasing functionalities of IoT devices in different application domains are causing IoT industries to grow at a tremendous rate. An IoT device (e.g., fitness band, heart rate monitor, bike-mounted stride sensor) may be configured to advantageously connect with another more resourceful device, such as a smartphone, to be fully functional.

Bluetooth Low Energy

For many IoT devices, intercommunication as well as communication with more resourceful devices occurs via Bluetooth Low Energy (also called Bluetooth Smart and Bluetooth LE) protocol. Bluetooth Low Energy (BLE) is a version of Bluetooth, which was introduced in the Bluetooth Core Specification Version 4.0 in 2010. BLE was designed to be the communication protocol for the Internet of Things (IoT) and optimized for power efficiency. The main feature of BLE is that it supports relatively low bit rate communications. While a theoretical upper bound is 1 Mbps, practical chips have much lower speeds (e.g., Nordic Semiconductor nRF51822 provides maximum 0.125 Mbps (41)). FIGS. 1A and 1B illustrate an exemplary Bluetooth classic protocol stack 102 and a BLE protocol stack 102, both known in the art. Recently-developed IoT devices, such as personal fitness trackers and bike stride sensors with a low energy requirement, commonly are designed with BLE as the only communication protocol.

Machine Learning Concepts

1) General Concept: Machine learning (ML) is a field of computer science dealing with data-oriented learning. The discipline is directed to making predictions on unseen data using knowledge inferred from existing data. Typically, from training data a set of features are extracted. Then, ML algorithms construct a model using operable features of the training data. This constructed model enables ML algorithms to make predictions on previously unseen data. In the context of this overall approach, ML provides many algorithms for particular prediction problems. Although many ML algorithms are provided off-the-shelf, to correctly use and interpret them users need to understand the algorithms' respective limitations and general machine learning approach. For instance, feature selection requires domain knowledge. More features do not necessarily provide better results. In fact, more features may cause a decrease in algorithm performance, which is called the curse of dimensionality. Also, when employing a small training set or using a complex algorithm, the algorithm can memorize data points and provide high performance on training data while providing low prediction performance on unseen data. This phenomenon is called overfitting. Feature set selection, algorithm selection, and result interpretation are all crucial to successful use machine learning (19).

2) Classification Algorithms: Several different ML algorithms are commonly available for classification purposes; from Bayesian to Decision Trees, to Nearest Neighbor, to Support Vector Machines (16). The most frequently used classification algorithms may be summarized as follows:

Decision Trees: Constructs a prediction model as a tree like structure from training data in which a tree node specifies a test on a feature while leaf nodes indicate the label of assigned class. Prediction of a new case requires a traversal on the model tree from root to leaf guided by features.

Random Forest: Constructs multiple Decision Trees and trains each of them with a random subset of training data. Each node utilizes a random subset of features. When a new case arrives, the prediction is determined by average predictions of all maintained Decision Trees.

Bayesian Classifier. Assumes that each feature of samples is independent of others, and applies Bayes' theorem to compute conditional probabilities. The classifier first extracts the conditional probability of each feature of training samples and predicts new case by computing most probable class, which is suggested by its features' conditional probabilities.

K-Nearest Neighbor (KNN): Stores all training samples with associated class labels. A KNN algorithm predicts a new case by the majority vote of K closest neighbors in feature space.

Support Vector Machines (SVM): Divides training samples into separate classes by a clear gap. SVM predicts a new case according to which side it falls on.

Artificial Neural Networks (ANNs): Inspired from biological neural networks, which they imitate both structurally and functionally. An ANN consists of a group of interconnected computational units called neurons, which receive inputs and transform them according to a specified activation function to generate an output. ANN uses training data to register the pattern in neurons and make predictions using learned patterns.

3) Performance Metrics: Measurements commonly used to interpret the performance of an ML study (12) may be summarized as follows:

accuracy: the ratio of correct prediction over all predictions, calculated as follows:

$$\text{accuracy} = \frac{TP+TN}{TP+TN+FP+FN} \quad (1)$$

where TP, TN, FP, and FN refer to True Positive, True Negative, False Positive, and False Negative, respectively.

recall: the ratio of correct identifications over the class size, calculated as follows:

$$\text{recall} = \frac{TP}{TP+TN} \quad (2)$$

precision: the ratio of correct identifications over all predicted identifications, calculated as follows:

$$\text{precision} = \frac{TP}{TP+FP} \quad (3)$$

ROC Area: the area under the curve on true positive rate versus the false positive rate plot.

PRC Area: the area under the precision-and-recall curve.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems and methods for fingerprinting an Internet of Things (IoT) device by receiving a training label and training dataset associated with the IoT device, wherein the training dataset comprises training wireless IoT packets. A classifier is selected from a set of machine-learning (ML) classification algorithms (e.g. Random Forest), and a filter is selected from a set of filters (e.g., filtering by packet length or packet type). After filtering the training dataset, a training feature vector is determined by calculating an inter-arrival-time (IAT) associated with the filtered training data set and a density distribution for the IAT. After converting the density distribution to the training feature vector (e.g., histogram, wherein each bin height in the histogram represents a respective feature in the training feature vector), a prediction model and the selected classifier are associated with the IoT device using the training feature vector.

Similarly, the present invention may receive a testing dataset comprising testing wireless IoT packets, and retrieve the prediction model and the selected filter. After filtering the testing dataset, a testing feature vector may be determined by calculating a second inter-arrival-time (IAT) associated with the filtered testing data set, calculating a second density distribution for the second IAT, and converting the second density distribution to the testing feature vector. Upon detecting a match, using the prediction model as applied to the testing feature vector, the present invention may display an association of the testing dataset to the IoT device (i.e., identification).

The IoT device may be of a peripheral mode type (e.g., a fitness band, a heart rate monitor, and a bike-mounted stride sensor), or of a central mode type (e.g., a smart watch, a smart phone, and a smart tablet). The wireless IoT packets may be of an ATT-protocol type configured to transfer user data or of an LELL-protocol type configured to transfer control data.

The ML classification algorithms may be of a function type (e.g., Support Vector Machine, Multilayer Perception, Neural Network, Sequential Minimal Optimization (SMO), Artificial Neural Network (ANN), and Simple Logistic); a Bayes type (e.g., Bayes Net, Naïve Bayes, Naïve Bayes Multinomial Updateable, and Naïve Bayes Updateable); a rules type (Decision Table, K-Nearest Neighbor, JRip, OneR, and PART); and a trees type (Random Forest, Random Tree, Decision Stump, HoeffdingTree, J48, and LMT RE PTree).

Upon determining a respective accuracy for each possible pairwise combination of the ML classification algorithms and the filters (e.g., 10-fold cross validation), one of the ML classification algorithms characterized as most frequent in best-performing list may be selected; and one of the filters characterized as most frequent in the best-performing list also may be selected. Most frequent may, for example, and without limitation, may constitute top 15 percent.

Objectives of the present invention include providing a simple, alternative, and efficient apparatus to identify IoT devices independent of the easily forged identifiers such as IP and MAC addresses. The invention has the immediate and future applications in the following areas:

Security: Allow the easy and non-intrusive identification of the IoT devices for security purposes, including:

Access control: Access control is a security measure in which the access to resources is restricted to a selective set of users, devices, or systems. The present invention may support existing access control mechanisms utilizing the identified device type information from the framework. In this way, a device ID will complement the access control decisions.

Authentication: A security procedure in which the identity of users or systems are confirmed. The present invention may provide complementary security measures to the authentication functions. An identified IoT device would serve to increase the confidence of the authentication process.

Device security posture: Provide information about the overall security status for the device in question. The present invention may detect malfunctioning device functions.

Catching insider-threats: One of the most significant problems in the security field, especially in organizations such as military and government settings that demand high security in their operations. Because the present invention may involve the usage of device identification based on device features, even if an authorized IoT or its user starts to behave differently, its device profile will differ, which would allow the insider threat to be captured.

Catching fake IoT devices with fake components: Counterfeit IoT devices or devices with corrupted hardware or software components may exist in the IoT realm (network) without the knowledge of an administrator. The present invention may detect fake IoT devices with fake/counterfeit components as they will differ in their IoT features observed via the disclosed technique.

BRIEF DESCRIPTION OF THE DRAWINGS

FIG. 5A is a listing illustrating an exemplary learning algorithm for the training process of FIG. 3.

FIG. 5B is a listing illustrating an exemplary select best classifier and filter algorithm for the training process of FIG. 3.

FIG. 6A is a listing illustrating an exemplary generate feature vector algorithm for both the training process of FIG. 3 and the testing process of FIG. 4.

FIG. 6B is a listing illustrating an exemplary testing algorithm for the testing process of FIG. 4.

FIGS. 7A, 7B, 7C, 7D, 8A, 8B, 8C, 9A, 9B, and 12 are graphs illustrating empirical inter-arrival-time (IAT) density distributions for exemplary IoT device capture test scenarios using an IoT device identification (ID4IoT) system according to an embodiment of the present invention. In some instances, the density of the data plotted in these graphs makes the individual plot lines difficult to distinguish. However, the significance of FIGS. 7A-9B and 12, and the data reflected therein, is apparent from the comparative distinctions as between devices resulting from the disclosed invention.

FIG. 10A is a table illustrating empirical identification accuracy for exemplary IoT device capture test scenarios using an IoT device identification (ID4IoT) system according to an embodiment of the present invention.

FIG. 10B is a table illustrating empirical performance metrics for exemplary IoT device capture test scenarios using an IoT device identification (ID4IoT) system according to an embodiment of the present invention.

FIG. 12 reflects a comparison of inter-arrival-time density plots for a genuine and a cloned device.

DETAILED DESCRIPTION OF THE INVENTION

Figure 1:
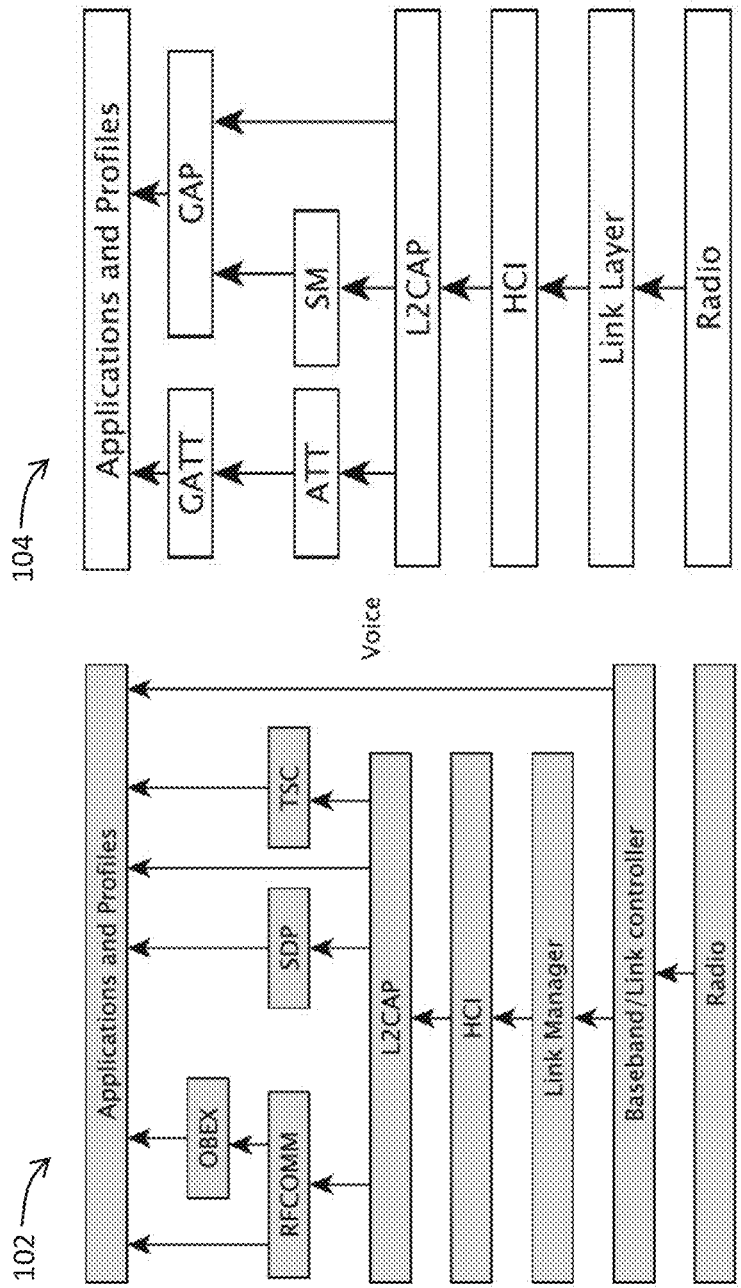
FIGS. 1A and 1B are schematic diagrams illustrating exemplary wireless Internet of Things (IoT) protocol stacks according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The present invention may be employed to advantageously fingerprint wireless IoT protocol speaking devices, thereby allowing such device fingerprints to advantageously identify such devices as an additional security measure to complement known security mechanisms. In certain embodiments, the present invention may comprise a device identification framework which may incorporate machine language (ML) techniques with side channel information from passive wireless IoT packet captures.

More specifically, an embodiment of the invention, as shown and described by the various figures and accompanying text, provides systems and methods of dynamically selecting a best classifier for IoT device identification among a number of different machine learning (ML) classifiers, and exploiting a passive non-intrusive feature selection technique in the identification of IoT devices based on wireless IoT protocols. For example, and without limitation, the disclosed device identification framework may incorporate ML techniques with side channel information from passive wireless IoT packet captures. The present invention focuses on the functional characteristics of wireless IoT protocol (for example, and without limitation, Bluetooth Low Energy (BLE) protocol, which is mostly used by resource-limited IoT devices), and the automated, dynamic selection of an optimum classification algorithm from a stored library of supported algorithms, such as Decision Tree, Random Forest, Bayesian Classification, K-Nearest Neighbor, Support Vector Machines, and Artificial Neural Networks. A person of skill in the art will immediately recognize that the design of the present invention may operate successfully against any wireless IoT protocol including, but not limited to, Bluetooth Smart, ZigBee, 6LowPan, IEEE 802.15.4, Z-Wave, LTE-Advanced, Wifi-Direct, RFID, HomePlug, MOCA, and NFC protocols.

Figure 2:
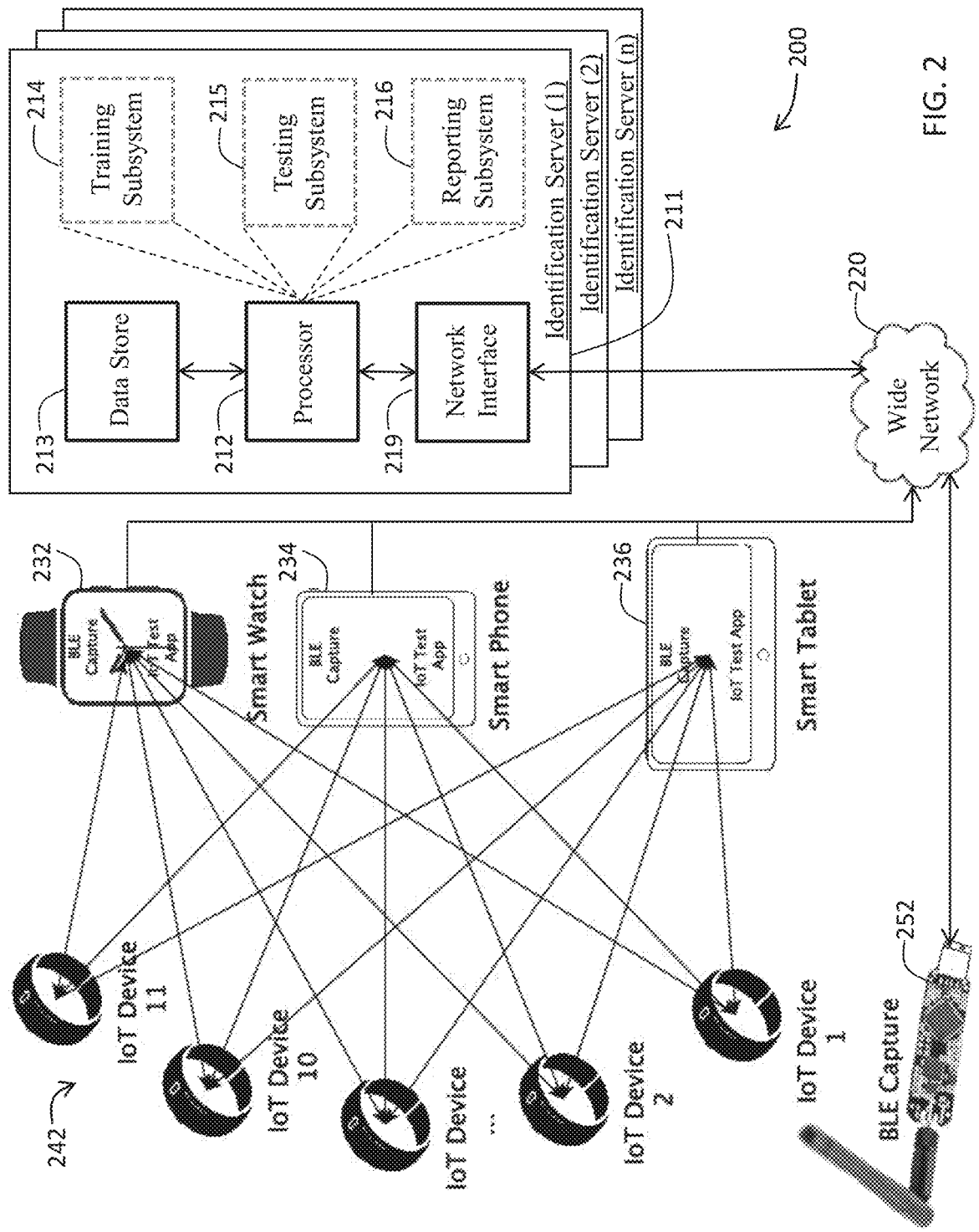
FIG. 2 is a schematic diagram of an IoT device identification (ID4IoT) system according to an embodiment of the present invention.

Referring now to FIG. 2, an IoT device identification framework (ID4IoT) system 200 according to an embodiment of the present invention will now be discussed in greater detail. The architecture of the present invention may comprise a peripheral device configured in data communication with a central device, where central devices are typically more resourceful and Internet-connected than peripheral devices. The central device may, in turn, be configured in data communication with an identification server that may train on labeled wireless IoT packet data for a given IoT device, and may subsequently test unlabeled wireless IoT packet data to identify that IoT device in operation.

For example, and without limitation, an ID4IoT system 200 may implement an automated method of fingerprinting wireless IoT protocol devices and of employing such fingerprinting to identify such devices as a complementary function to known security measures. As illustrated in FIG. 2, the ID4IoT system 200 may include one or more Identification Servers 211, which may be in data communication with some number of IoT devices 242, 252. The IoT devices 242, 252 each may be coupled to the Identification Server 211 using a wide area network 220 such as the Internet. The Identification Server 211 also may have access to IoT devices 242 through intermediary resourceful devices 232, 234, 236 and/or through the Internet 220 direct connect to an IoT device 252.

For example, and without limitation, the intermediary resourceful devices 232, 234, 236 may comprise a web browser and/or a communication application. "Web browser" as used herein includes, but is not limited to, any application software or program (including mobile applications) designed to enable users to access online resources and conduct trusted transactions over a wide network such as the Internet. "Communication" as used herein includes, but is not limited to, electronic mail (email), instant messaging, mobile applications, personal digital assistant (PDA), a pager, a fax, a cellular telephone, a conventional telephone, television, video telephone conferencing display, other types of radio wave transmitter/transponders and other forms of electronic communication. For example, and without limitation, the intermediary resourceful devices 232, 234, 236 may be configured to execute web applications designed to function on any cross-platform web server running Apache, MySQL, and PHP. Those skilled in the art will recognize that other forms of communication known in the art are within the spirit and scope of the present invention.

Continuing to refer to FIG. 2, the Identification Server 211 may comprise a processor 212 that may accept and execute computerized instructions, and also may comprise a data store 213 that may store data and instructions used by the processor 212. More specifically, the processor 212 may be configured in data communication with some number of IoT devices 242, 252 either directly (defined as peripheral mode) or through some number of intermediary resourceful devices 232, 234, 236 (defined as central mode). The processor 212 may be configured to direct input from other components of the ID4IoT system 200 to the data store 213 for storage and subsequent retrieval. For example, and without limitation, the processor 212 may be in data communication with external computing resources 232, 234, 236 through a direct connection and/or through the network connection 220 facilitated by a network interface 219. Training Subsystem 214 instructions, Testing Subsystem 215 instructions, and Reporting Subsystem 217 instructions may be stored in the data store 213 and retrieved by the processor 212 for execution. Although the data store 213 of FIG. 2 is shown as local storage, a skilled artisan will recognize that the data store 213 may alternatively, or in addition, comprise one or both of server-based storage and cloud storage.

The Training Subsystem 214, according to embodiments of the present invention, may be configured to advantageously create a prediction model tailored to a training dataset for a known IoT device. The Training Subsystem 214 may accomplish prediction model tailoring by employing a best-fit among supported classifiers and filters.

The Testing Subsystem 215, according to embodiments of the present invention, may be configured to advantageously applying the prediction model and filter to a testing dataset to identify an unlabeled IoT device. The Testing Subsystem 215 may advantageously exploit wireless IoT packet filtering and inter-arrival-time (IAT) distribution for fingerprinting of an IoT device.

The Reporting Subsystem 216, according to embodiments of the present invention, may be configured to advantageously report device identification findings from execution of the prediction model. The Reporting Subsystem 216 may advantageously flag identification of an IoT device (or, alternatively, the failed identification of the source of an input wireless IoT packet) based on distinguishing features of the IAT vector density distribution for the tested device.

Exemplary operations of the Training Subsystem 214, the Testing Subsystem 215, and the Reporting Subsystem 216 are described individually in greater detail below. Those skilled in the art will appreciate, however, that the present invention contemplates the use of computer instructions that may perform any or all of the operations involved in prediction modeling, execution, and reporting. The disclosure of computer instructions that include Training Subsystem 214 instructions, Testing Subsystem 215 instructions, and Reporting Subsystem 216 instructions is not meant to be limiting in any way. Those skilled in the art will readily appreciate that stored computer instructions may be configured in any way while still accomplishing the many goals, features and advantages according to the present invention.

Employment of networking may permit the subsystems 214, 215, 216 of the ID4IoT system 200 to retrieve data from any number of external computing resources. Although the embodiment of the invention discussed herein describes the training, test, and reporting functionality performed by the subsystems 214, 215, 216 of the ID4IoT system 200 as illustrated in FIG. 2, those skilled in the art will readily appreciate that stored computer instructions may be configured in any way while still accomplishing the many goals, features and advantages according to the present invention.

IoT Identification Framework

Figure 3:
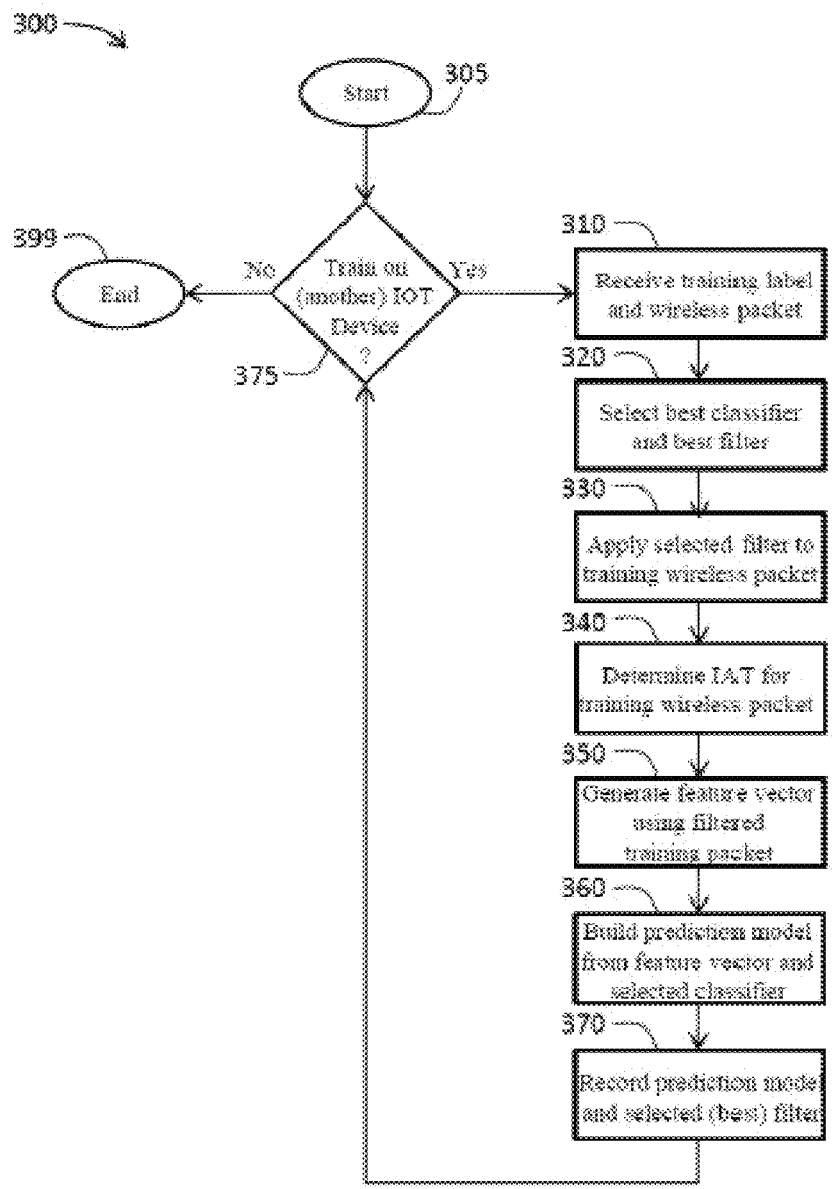
FIG. 3 is a flowchart illustrating an exemplary training process for IoT device identification according to an embodiment of the present invention.
Figure 4:
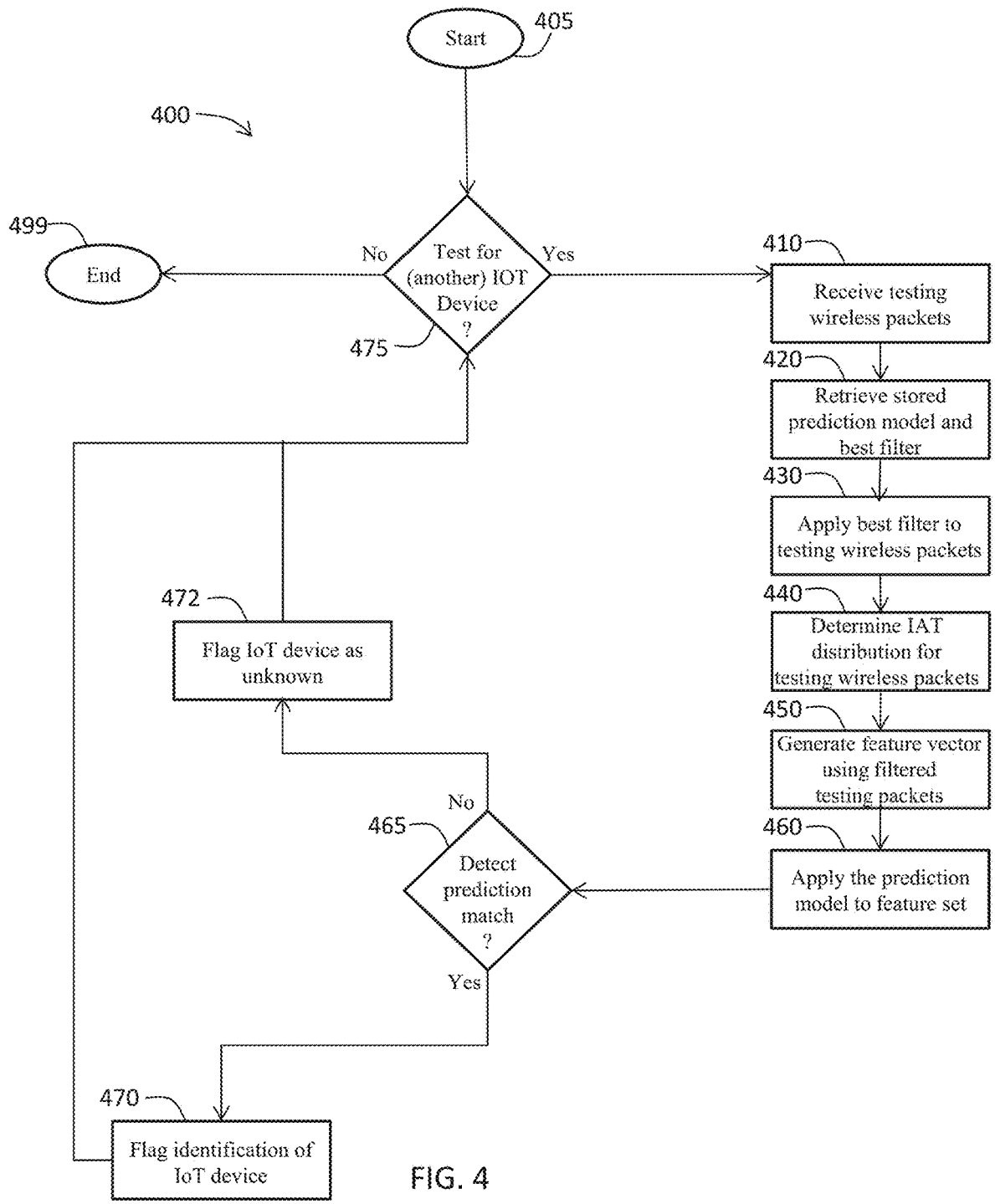
FIG. 4 is a flowchart illustrating an exemplary testing process for IoT device identification according to an embodiment of the present invention.

Referring now to FIGS. 3 and 4, and continuing to refer to FIG. 2, an IoT device identification framework (ID4IoT) as implemented by the ID4Iot system 200 may comprise the following main functional components:

Packet capture: Wireless IoT (e.g. BLE) packets may be captured actively at an authenticator side, or passively via a wireless IoT capture tool (e.g., Ubertooth (2)). In the training case, labels indicating actual devices in the captures are also needed.

Best classifier and filter selection: The ID4IoT system 200 may automatically test a set of ML classification algorithms and a set of filters on the wireless IoT captures using training data to select the best performing algorithm and filters (see also algorithm 504 at FIG. 5B, as described in detail below). For example, it may return "Random Forest" as an Algorithm and "protocol=L2CAP and length>20" as a filter among all possible algorithms and filters.

Filtering: Wireless IoT packet capture may contain packets from multiple protocols and various lengths. Filtering involves application of chosen filters to captured packets.

IAT extraction and Feature Vector construction: This component is directed to grabbing the features from the wireless IoT packets. The ID4IoT system 200 may first extract inter-arrival-times (IAT) of a wireless IoT packet of interest, and then may construct for each a feature vector using its distribution (see also algorithm 602 at FIG. 6A, as described in more detail below).

Model generation: The ML classifier may be trained to construct a prediction model tailored to the input wireless IoT packet of interest.

Prediction: The ID4IoT system 200 may utilize the tailored prediction model to predict the identity of the wireless IoT device of interest from its unlabeled capture.

The ID4IoT framework may follow a typical ML approach, consisting of a training phase 300 and a testing phase 400. For example, and without limitation, the framework may make use of classifiers from the Weka (15) project and also an external neural network implementation (3). An exemplary set of classifiers that may be used in the framework of the present invention is set forth in Table I.

TABLE I

Example ML Classifiers

| Type | Name |
| --- | --- |
| Functions | LibSVM, MultilayerPerceptron, NeuralNetwork, SMO, SimpleLogistic |
| Bayes | BayesNet, NaiveBayes, NaiveBayes-MultinomialUpdateable, NaiveBayesUpdateable |
| Rules | DecisionTable, JRip, OneR, PART |
| Trees | DecisionStump, HoeffdingTree, J48, LMT, REPTree, RandomForest, RandomTree |

Referring now to FIG. 3, a method aspect of the training phase 300 operation of the ID4IoT system 200 will now be discussed in more detail. From the start at Block 305, the system 200 may receive a training label and a wireless IoT packet (Block 310). At Block 320, a best classifier and best filter will be selected by the system 200 for the labeled input (i.e., the training wireless packet). After applying the selected filter to the training wireless packet (Block 330), the system 200 may determine an inter-arrival-time vector for the training wireless packet (Block 340). Using the now-filtered training packet, the system may generate a feature vector (Block 350) and may construct a prediction model from the feature vector and selected classifier (Block 360). After recording the prediction model and selected (i.e., best) filter (at Block 370) for future use in a testing phase 400, the system 200 may repeat the training steps for all desired IOT devices (Block 375) using additional labeled input until no other training is desired, at which point the training phase 300 may end (Block 399).

Referring now to FIG. 4, a method aspect of the testing phase 400 operation of the ID4IoT system 200 will now be discussed in more detail. From the start at Block 405, the system 200 may receive a testing wireless IoT packet (Block 410). At Block 420, a saved prediction model and best filter will be retrieved by the system 200 for the testing wireless packet. After applying the best filter to the testing wireless packet (Block 430), the system 200 may determine an inter-arrival-time vector for the testing wireless packet (Block 440). Using the now-filtered testing packet, the system may generate a feature vector (Block 450) and may apply the retrieved prediction model to the feature set (Block 460). If the system 200 detects a prediction match at Block 465, the system 200 may flag a successful identification of the wireless IoT device (Block 470). If no prediction match is detected, the system may flag the IoT device as unknown (Block 472). A prediction match, or simply a match, in this context means that the applied prediction model outputs a predicted association with one or more known IoT device types (e.g., "Apple Watch"). In other words, a "match" should be understood to mean an output inference resulting from the applied model that points to one or more known IoT device types. Accordingly, the "unknown" result/output at block 472 means no inference or prediction could be made under that particular instance/test application. The system 200 may repeat the testing steps (Block 475) for additional input packets until no other testing is desired, at which point the testing phase 400 may end (Block 499).

Referring now to FIGS. 5A, 5B, 6A, and 6B, exemplary algorithmic implementations of the training and testing methods illustrated in FIGS. 3 and 4, respectively, will now be discussed in more detail. In one embodiment, the ID4IoT system 200 may be configured in the training phase 300 to determine for an input training dataset ds a best filtering and to construct a prediction model for ds (for example, and without limitation, as detailed in exemplary learning algorithm 502 at FIG. 5A). The ID4IoT system 200 may be further configured in the training phase 300 to pick the best performing ML algorithm among all supported algorithms (for example, and without limitation, using the selection algorithm 504 of FIG. 5B). More specifically, the algorithm Select Best Classifier and Filter 504 may operate against a training dataset ds, a set of supported ML algorithms algs, and a set of filters filters. The system 200 then may compute the accuracy for each algorithm alg in algs and each filtering f on training data ds using ten-fold cross validation, and may record a vector of <alg, accuracy> pairs. Then, Select Best Classifier and Filter 504 may select the top 15 percent of best-performing algorithms and may compute the frequency of each algorithm in this top list. The most frequent algorithm may be picked as the best algorithm. Best filtering may be determined with a similar approach, and the selected algorithm and filtering may be used in the testing phase 400. Examples of cross-validation algorithms are disclosed in Sylvain Arlot, Alain Celisse. "A survey of cross-validation procedures for model selection," Statistics Surveys, Institute of Mathematical Statistics (IMS), 2010, 4, pp. 40-79.

For example, and without limitation, feature generation may be implemented as shown in algorithm 602 at FIG. 6A. To generate the feature vector, inter-arrival-time vector iat may first be computed from the input dataset ds. Then, the density distribution dd of iat vector may be generated by the system 200. Finally, this distribution dd may be used to determine a histogram, and each bin height in the histogram may become a feature in the feature vector. In the testing phase 400, as detailed in algorithm 604 at FIG. 6B, a capture from an unseen new IoT device may be filtered and its feature set may be computed. Then the ML prediction model, which is constructed at learning phase 300, may be applied to the feature set to predict the identity of the new device.

Performance Evaluation

To evaluate the feasibility and efficiency of the ID4IoT framework of the present invention under realistic operational conditions, three testbeds were employed with a set of representative BLE speaking IoT devices to study different test scenarios empirically. The performance evaluation methodology, and observed results, are described below.

Testbed and Methodology

Performance of the ID4IoT framework, according to embodiments of the present invention, were evaluated using off-the-shelf IoT devices. As described above, BLE protocol defines two device modes: peripheral mode, and central mode. In the peripheral mode, BLE devices serve sensor data, and BLE is analogous to a wireless sensor data serving protocol. BLE peripheral devices can operate in three modes: non-connectable advertising, scannable, and connectable. For example, BLE devices broadcast advertisement messages with advertisement data using peripheral mode. Scannable devices respond to scan queries from other BLE speaking devices Also, connectable devices support connections with central mode devices. In central mode, devices can query and connect to other peripheral mode devices. BLE is analogous to a wireless sensor data reading protocol when in central mode.

Peripheral devices are connected to central devices where central devices are typically more resourceful and Internet-connected devices. In the subject experiments, eleven IoT devices were used with BLE peripheral role and three testbeds were setup around different central mode devices (i.e., as illustrated in FIG. 2, a Smart Watch 232, a Smart Phone 234, and a Smart Tablet 236). In all testbeds, the goal was to test if ID4IoT framework performance is reproducible on different central devices, and also if trained models are central device-dependent. The peripheral IoT devices 242, 252 utilized in the subject experiments are listed in Table II below. (Note: Also, an Ubertooth device was setup to passively capture all the BLE traffic).

TABLE II

List of BLE-speaking IoT devices used in the experiments

| Make | Marketing Name | Referred Name |
|---|---|---|
| Apple | Apple Watch | Apple Watch |
| Misfit | Shine | Shine |
| Huawei | ColorBand | ColorBand |
| Jawbone | UP3 | UP3 |
| Fitbit | Fitbit Flex | Fitbit Flex |
| Scosche | Heart Rate Rhythm+ | Heart Rate Monitor Rhythm+ |
| August | Smart Lock | Smart Lock |
| Polar | Stride Sensor | Stride Sensor |
| Texas Instruments | CC2541 Keyfob | TI CC2541 Keyfob |
| Runtastic | Speed and Cadence Bike Sensor | Bike Sensor |
| Polar | H7 Heart Rate Sensor | H7 Heart Rate |

Furthermore, an IoT test program was employed with Android wear to execute on central devices. The test program scanned for BLE peripherals both near to and connected to them. At each connection, the testbed read all the characteristics served by the connected peripheral device. Then, the testbed disconnected and switched to the next peripheral device. Meanwhile, the external Ubertooth device captured all the BLE traffic. For each peripheral-central pair, the experiments were repeated forty times.

Experiments and Results

Figure 7A:
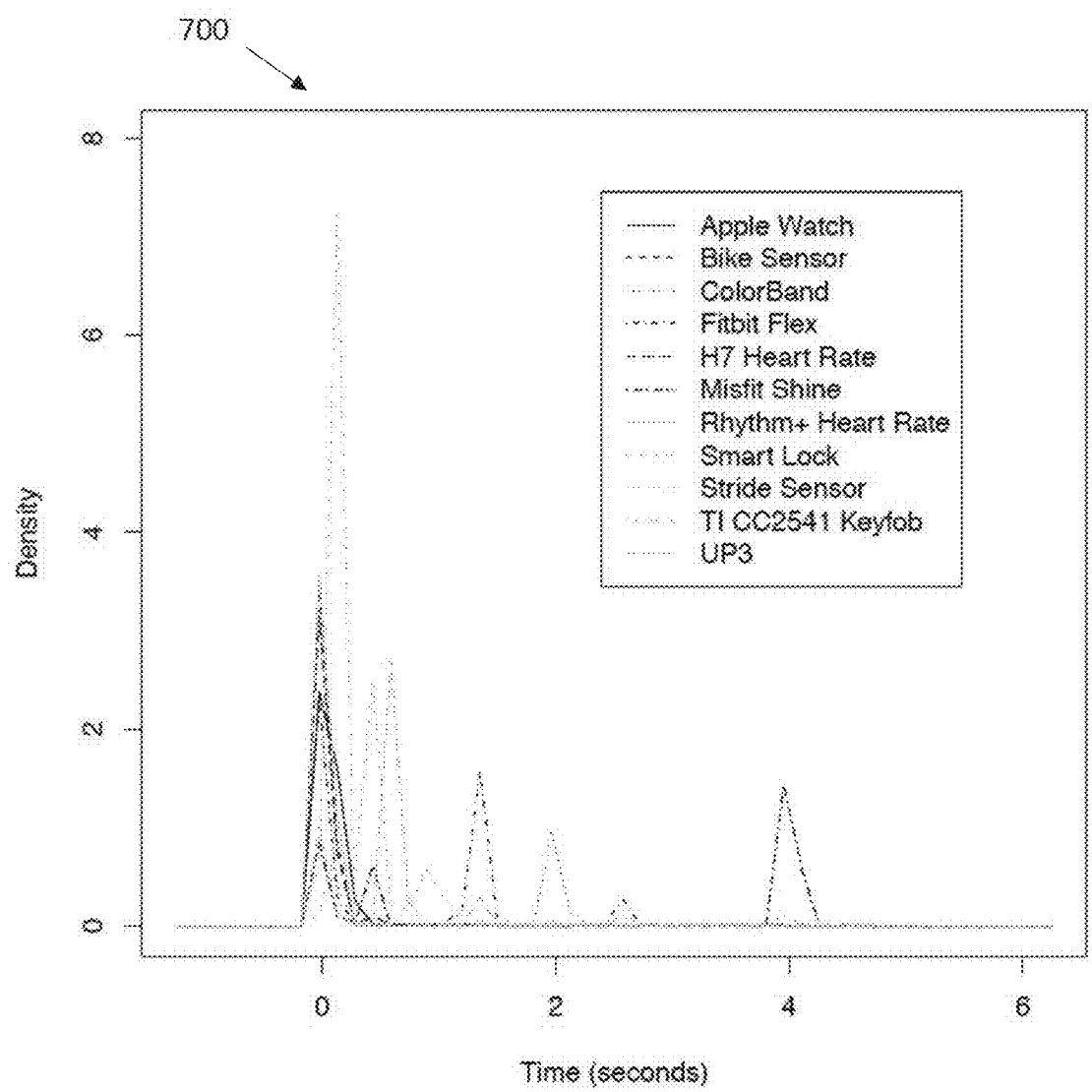

As mentioned earlier, ID4IoT exploits the packet interarrival-time (IAT) distribution to construct the feature vector for ML. Experiment results 700 for all packets are illustrated in FIG. 7A, where eleven IoT device captures are presented in density plots (Note: In density plots, the total area under each curve is equal to one). As seen in the FIG. 7A, the densities for different devices are visually distinguishable. Also studied were means of filtering BLE packets to increase feature quality. First, packets were filtered depending on the purpose of the communication: data traffic versus control traffic. In BLE, ATT protocol is used to transfer user data while LELL protocol transfers control data. Then, the packets were evaluated based on the packet length.

Figure 7B:
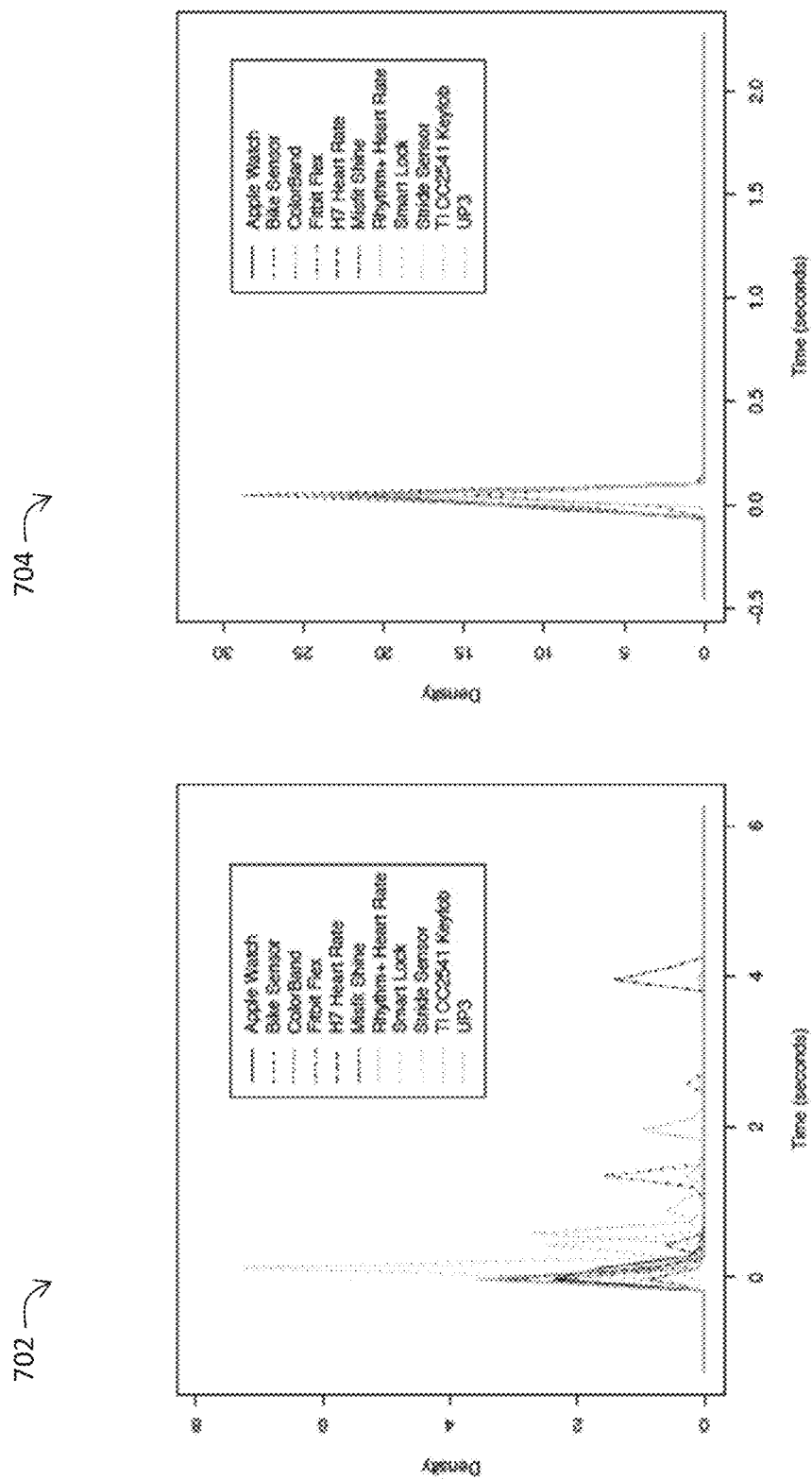
Figure 7C:
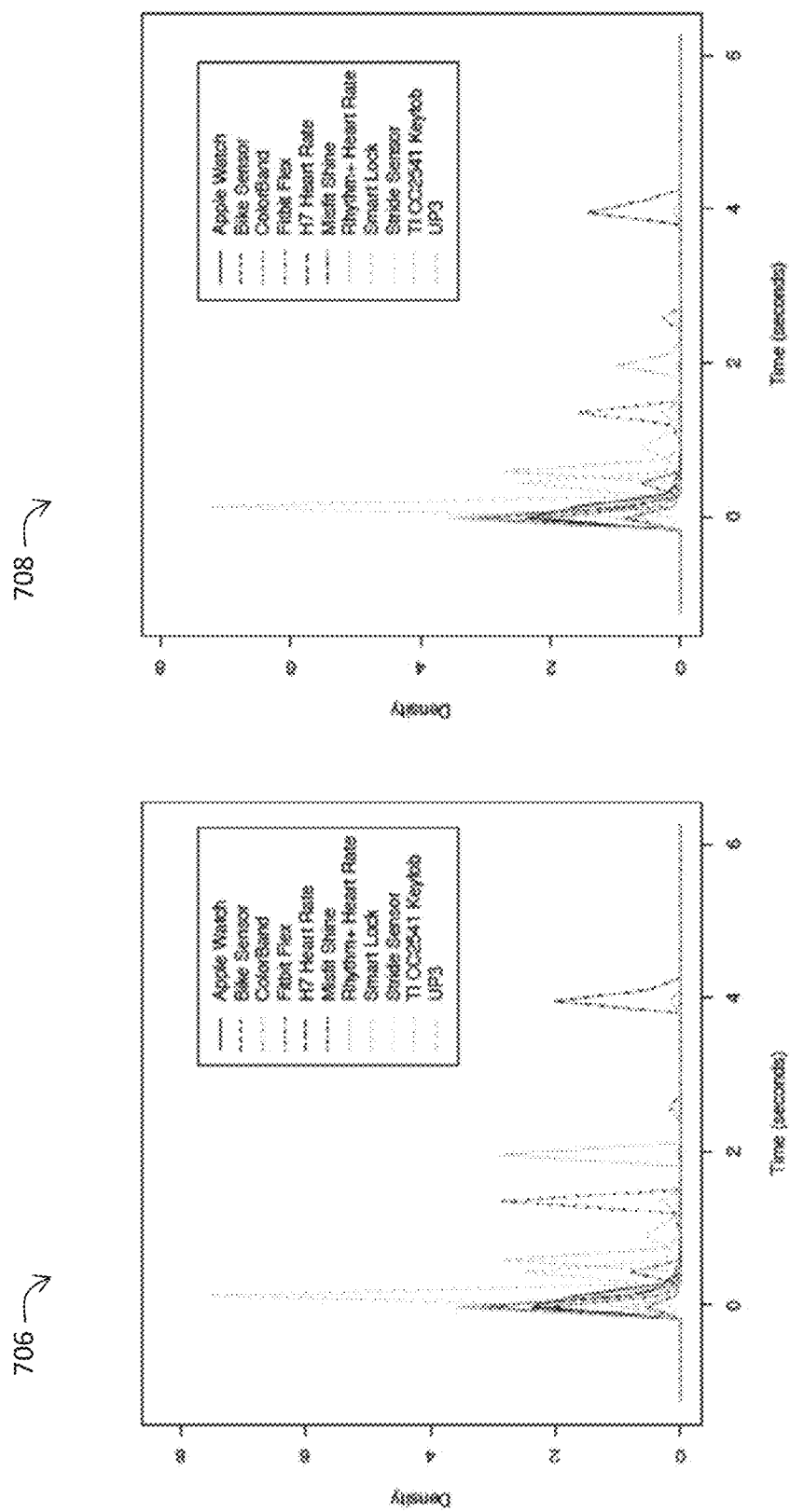
Figure 7D:
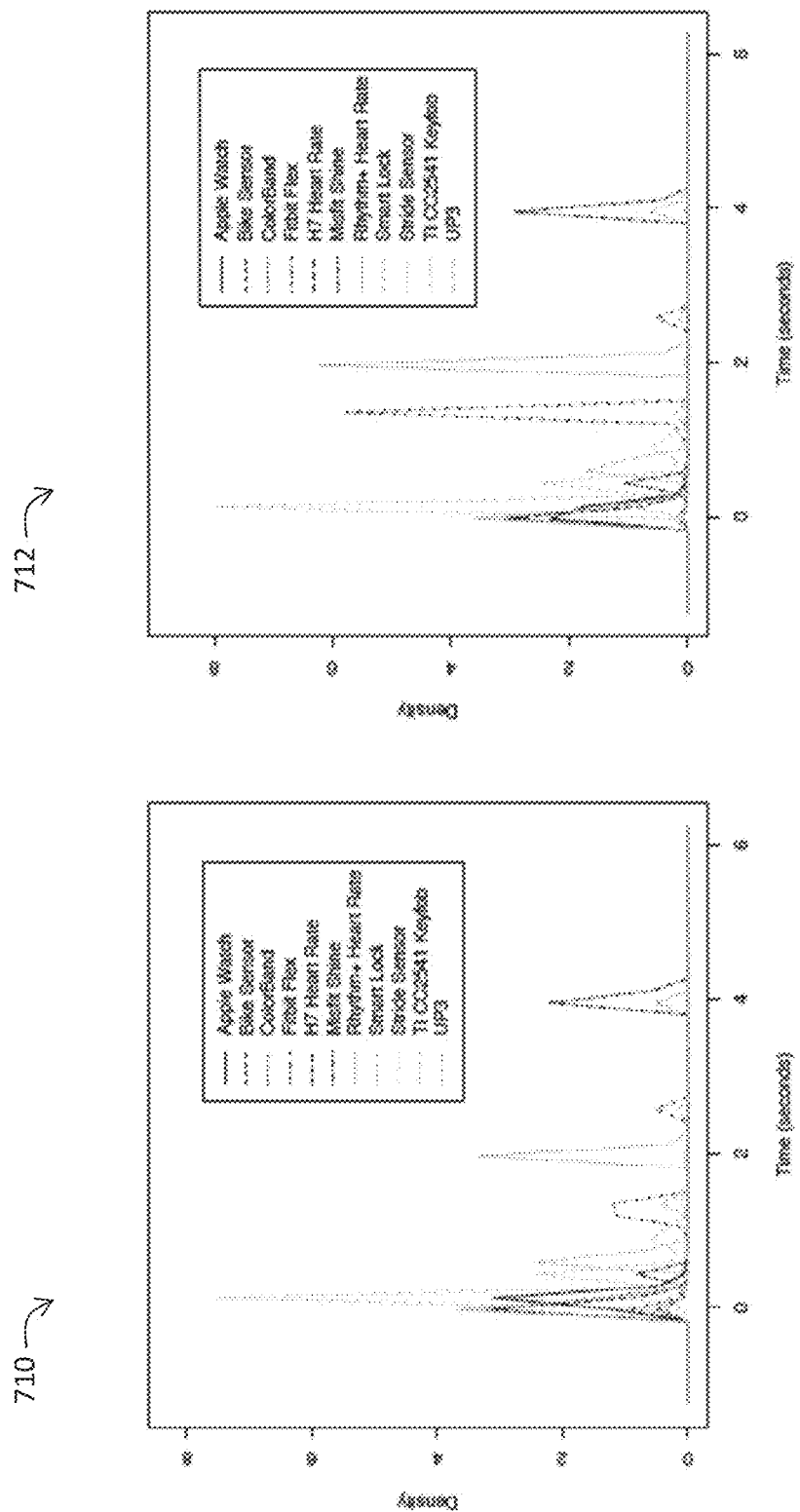

FIGS. 7B, 7C, and 7D illustrate exemplary IAT density distributions for eleven BLE devices demonstrating a no-filtering case 702, as well as the effects of protocol (ATT for Data 704 and LELL for Control 706) and of representative packet lengths 708, 710, 712.

Figure 8A:
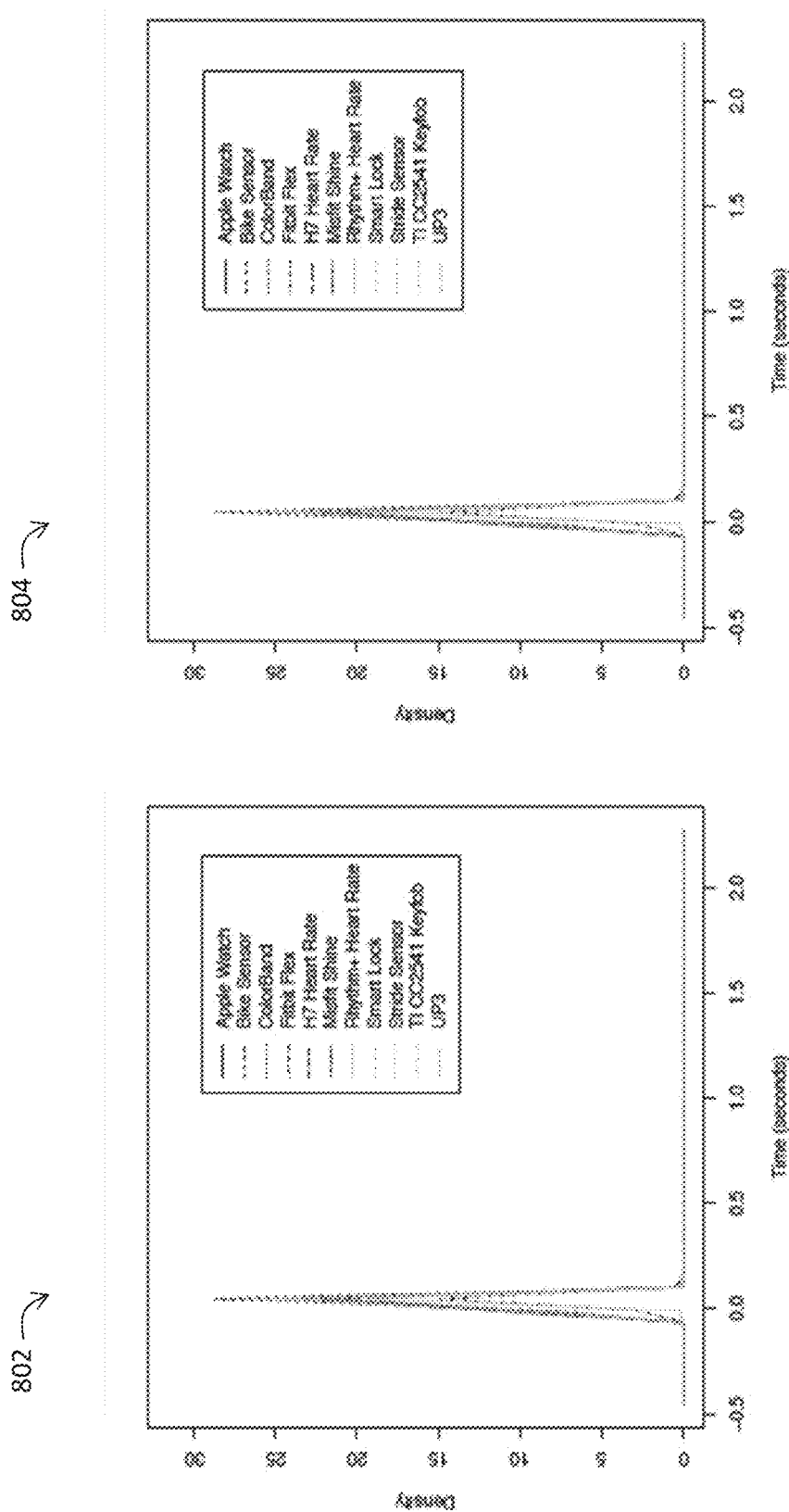
Figure 8B:
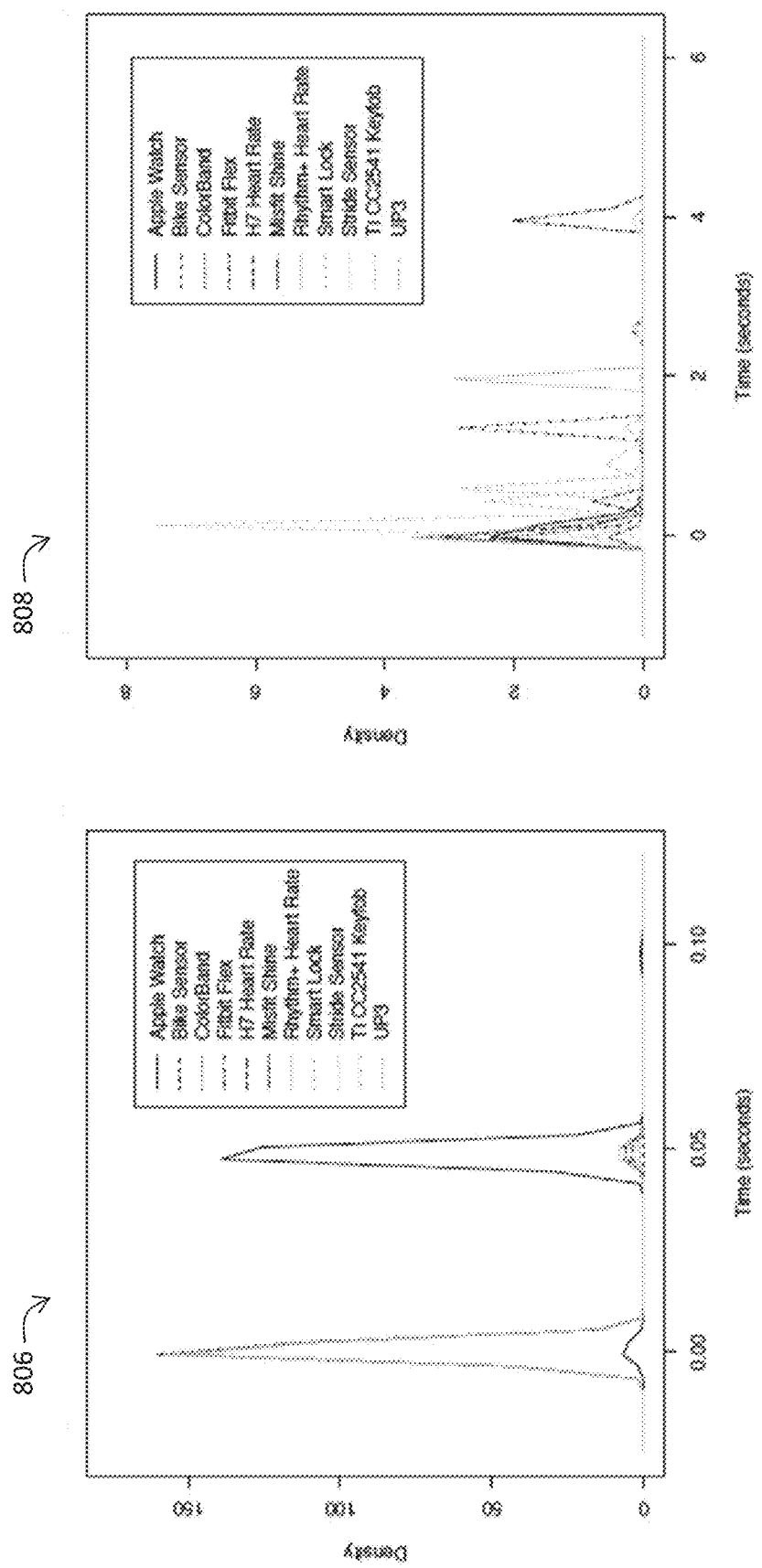

FIGS. 8A, 8B, and 8C illustrate exemplary IAT density distributions of IoT devices with BLE when both underlying BLE protocol type (ATT for DATA 802, 804, 806; and LELL for Control 808, 810, 812) and packet length are considered.

In the findings illustrated, although data traffic in 704 shows similar distributions, control traffic in 706 displays further distinct curves. Graphs 708, 710, and 712 show different packet length filtering on density curves. length>k states only packets larger than k bytes are considered. Packet length filtering displays improvements in the separation of density curves. For example, ColorBand and Fitbit curves stray from each other in graphs 710 and 712 compared to graph 708. Also, the protocol and length parameters were investigated together. FIGS. 8A, 8B, and 8C illustrates control and data protocols with different packet lengths. Larger packets on control channels display more distinct density curves. For instance, graph 812 provides better-separated curves where control packets larger than 44 bytes were considered. Finally, test results were used to evaluate certain packets in the data and control communications. BLE packets generated without any user involvement were chosen for evaluation, so that these might reveal vendor-specific implementation of BLE spec.

Figure 9A:
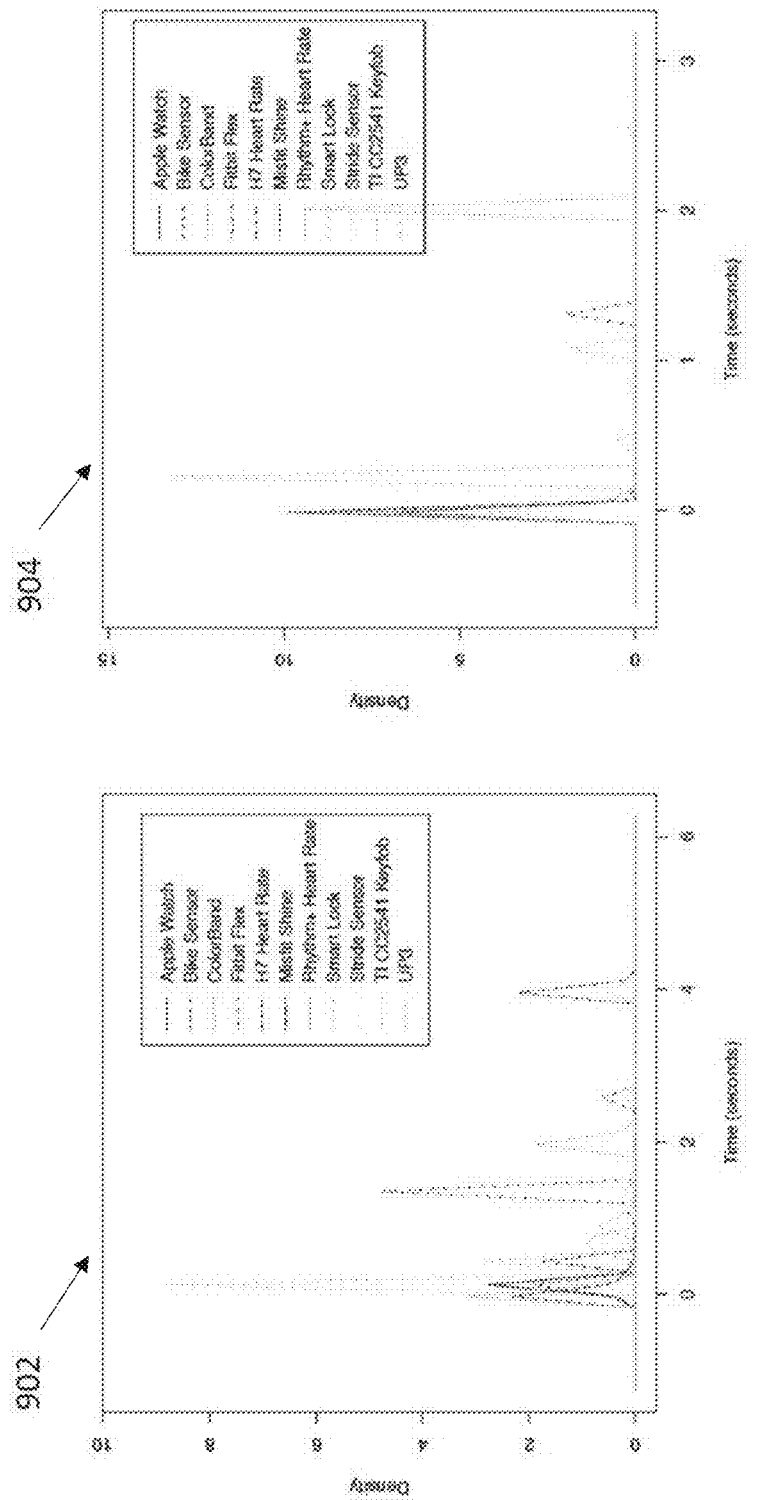
Figure 9B:
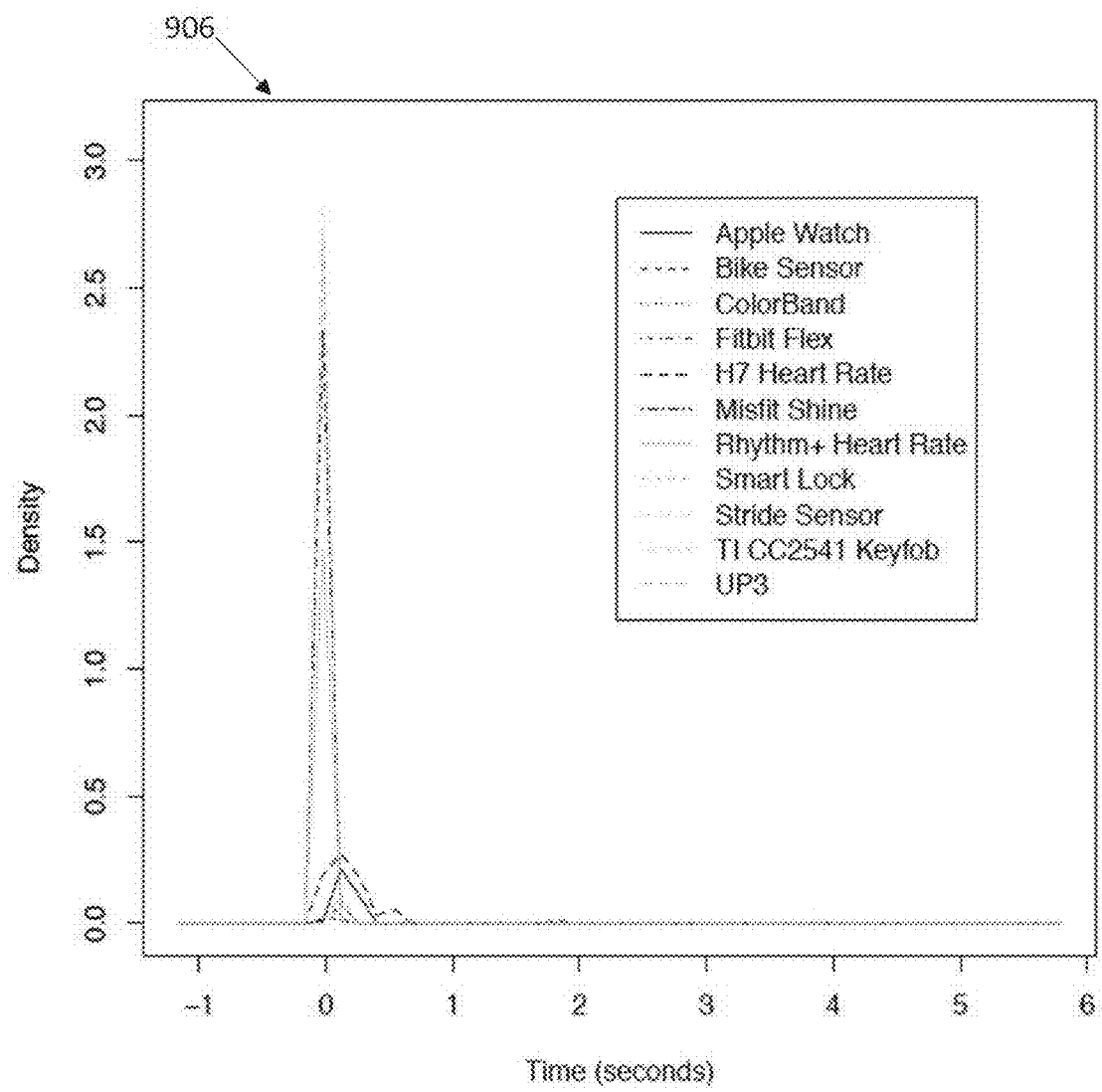

ADV IND and SCAN RSP packets were used in control communication. BLE peripheral mode broadcasts ADV IND packets when a device so configured needs to be visible to other nearby devices (e.g., to be discovered for sensor data). When such a scannable device receives a SCAN REQ packet, the device generates and broadcasts a response packet SCAN RSP. On the other hand, when a BLE connection exists, to keep the connection alive when there is no operable data to send, Empty PDU packets are transmitted. The subject test considered these types of packets, and FIGS. 9A and 9B displays IAT density for such packet types. As illustrated, Empty PDU 906 and SCAN RSP 904 display some variations for different devices, while ADV IND 902 provides very clear identifiable curves for the IAT density.

Having demonstrated some insights on the potential of IAT density distribution to distinguish devices, and also how a set of filtering can improve this potential, the experiment divided IAT density curves into 300 bins and converted the area inside each bin into a feature as described in algorithm 602 (see FIG. 6A). Thus, each session in captures was enrolled as a sample in the dataset. Furthermore, as described above, the experiment used the Weka (15) software. In addition to the ML algorithms provided in Weka, the testbed included an external neural network implementation with a plugin for Weka (3). Following Weka conventions, the experiment used 66 percent of captured sessions for learning 300 and used the remaining for the testing phase 400. As described above, the ID4IoT framework was configured to choose the best ML algorithm from the training data as explained above (training phase 300 from FIG. 3) and as exemplified in algorithm 504 (FIG. 5B). The top-5 suggestions per testbed for ID4IoT framework executing algorithm 504 are shown in Table III below.

TABLE III

ID4IoT framework top-5 best classifier results per testbed

| Testbed | Frequency | Classifier |
| --- | --- | --- |
| Smart Tablet | 8 | Random Forest |
|  | 6 | LMT |
|  | 5 | Naive Bayes Updateable |
|  | 5 | Simple Logistic |
|  | 4 | Fitbit Flex |
| Smart Phone | 11 | LMT |
|  | 9 | Random Forest |
|  | 8 | Simple Logistic |
|  | 6 | Naive Bayes Multinomial Updateable |
|  | 6 | Logit Boost |
| Smart Watch | 10 | Random Forest |
|  | 5 | Naive Bayes Updateable |
|  | 5 | Naive Bayes |
|  | 5 | Logit Boost |
|  | 4 | PART |

Figure 11:
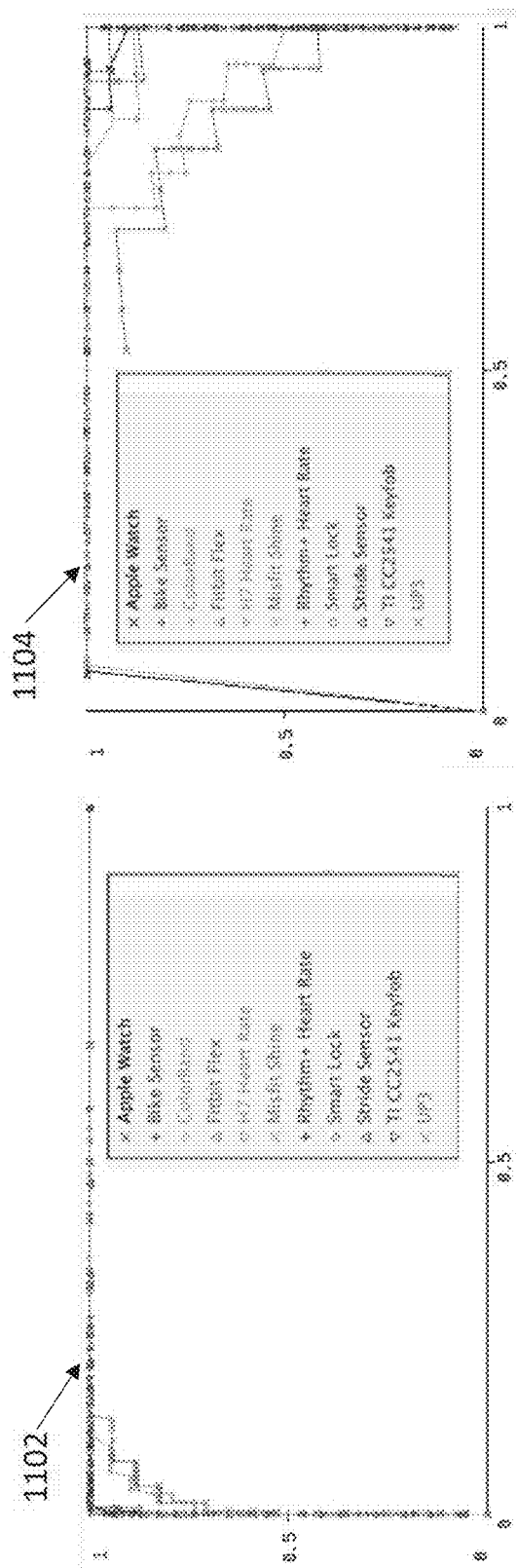
FIG. 11 is a pair of graphs illustrating empirical identification performance metrics for exemplary IoT device capture test scenarios using an IoT device identification (ID4IoT) system according to an embodiment of the present invention.

Table III above also reports the frequency value (as computed by algorithm 504), which is the number of times when accuracy of the associated classifier was in the top 15 percent among all classifiers for multiple filterings. The framework picked Random Forest algorithm as the best ML algorithm for SmartWatch and Smart Tablet testbeds while picking Logistic Model Trees (LMT) for Smart Phone testbed. Random Forest also shows the second highest rank in Smart Phone testbed. Test results per testbed are presented in graph 1010 of FIG. 10A with top-5 best performing filters. Filter name P-k states that only P protocol packets larger than k bytes are considered. ID4IoT framework-suggested filtering is marked in bold. Application of ID4IoT provided 94.7%, 95.2% and 92.5% accuracy for Smart Tablet, Smart Phone, and Smart Watch testbeds, respectively. In testing results, the ID4IoT framework suggested filtering is the top for Smart Tablet and Smart Watch testbeds, while filtering appears in top two for Smart Phone testbed. Graph 1020 at FIG. 10B and also the output graphs 1102, 1104 at FIG. 11 display the performance details for Smart Watch testbed with LELL-37 filtering case in which only LELL protocol packets larger than 37 bytes are considered. Other testbeds provide higher performance. Also tested was whether the ID4IoT framework can use pre-training from different testbeds. To evaluate this case, the training model from Smart Tablet testbed was used to test Smart Phone testbed data. The ID4IoT framework achieved 88.5% precision and 85.6% recall performance. This result shows that ID4IoT's success working with pre-trained models on different devices is promising.

Application Case

Figure 12:
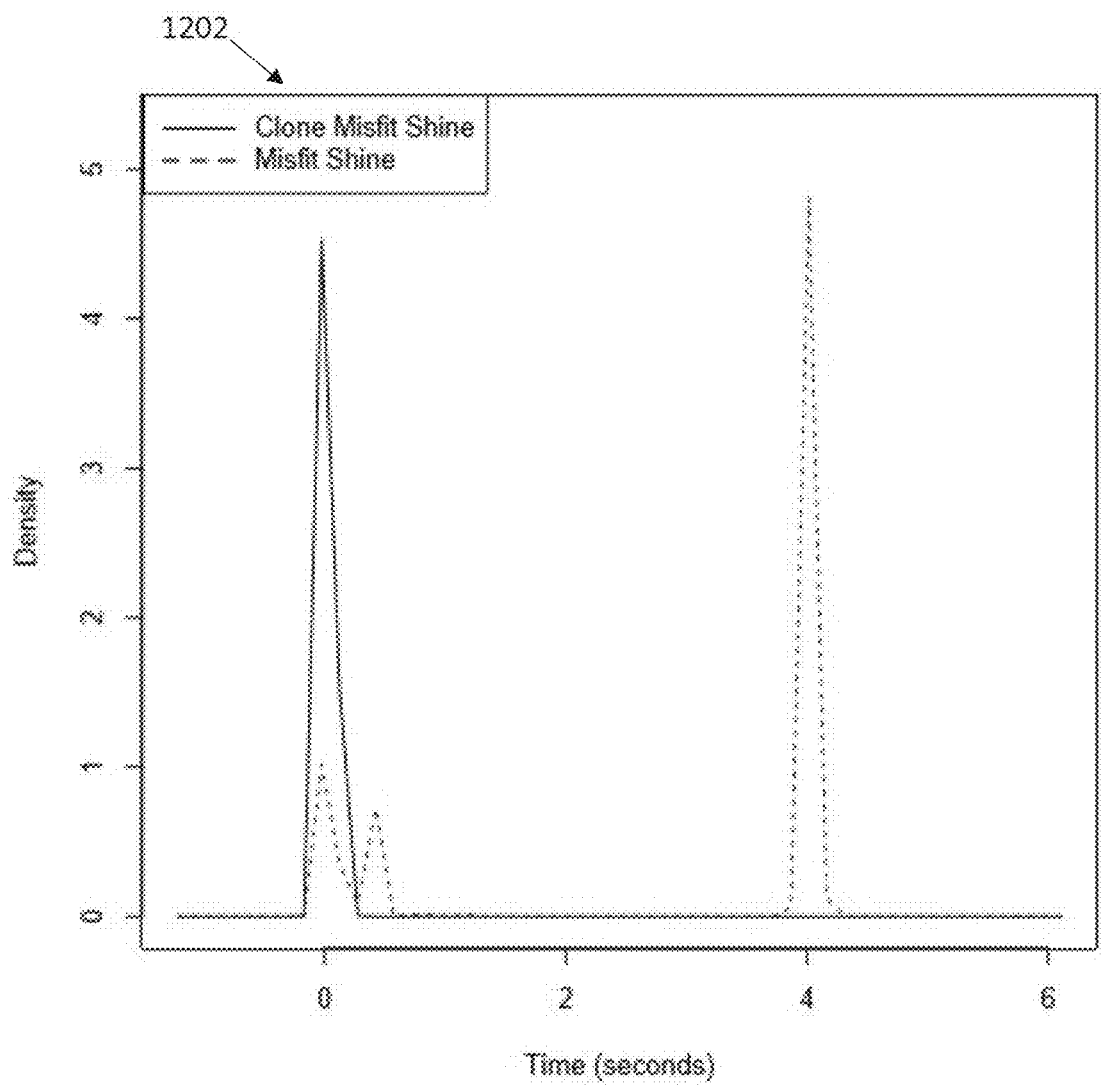

Counterfeit IoT device detection ID4IoT framework provides a mechanism to identify different IoT devices. This capability can be further exploited to distinguish a genuine IoT device from a counterfeit clone. Counterfeiting may present a very real threat when a smartphone, tablet, or a more powerful attacker tries to act as a real IoT device to a legitimate IoT device pair. To evaluate the efficacy of ID4IoT framework against such a threat, the subject experiments analyzed the performance of the identification solution of the present invention in a proof-of concept setup. To simulate a counterfeit IoT device, as a proof of concept, the subject experiment used the LightBlue App, which can emulate any BLE peripheral from an iPhone or an iPad (41). The test involved cloning a genuine Misfit Shine device and emulated it using the LightBlue App. Then, the same test setup discussed in 'Experiments and Results' above was used, and the densities of a genuine Misfit Shine device and its clone were compared. FIG. 12 (graph 1202) shows the resultant IAT density distributions. ID4IoT accuracy was also computed in this experiment. Even without any filtering applied, 97% accuracy was achieved. As seen from the results, exact services in an emulated device did not provide IAT distribution similar to the genuine one. The results support that IAT density distribution in BLE retains the hardware-firmware performance characteristics.

Therefore, as described and demonstrated above, embodiments of the ID4Iot framework advantageously performs device identification as a non-intrusive complementary security mechanism for IoT devices. Using a passive tool (e.g., Ubertooth), the present invention may advantageously capture and then filter wireless IoT traffic to get packets with clearly distinguishable density distributions, as shown, for example, and without limitation, in graph 810 at FIG. 8C. Furthermore, the ID4IoT framework is demonstrated to advantageously identify BLE-speaking IoT devices exploiting the timing side-channel of BLE protocol. ID4IoT framework utilizes a comprehensive set of Machine Learning (ML) algorithms (e.g., 20 different ML algorithms, as demonstrated), in the classification process, and picks the best performing algorithm on training data. Moreover, the performance of ID4IoT framework as executed to identify real IoT devices, including various fitness bands, bike stride sensors, heartrate monitors and smart watches, is described above as demonstrated on three testbeds reflecting common real-world deployments. Specifically, the detailed evaluation results show on average 92%-95% accuracy in identification for Smart Tablet, Smart Phone, and Smart Watch oriented testbeds. Also, the subject experiments demonstrated very promising results for pre-trained model usage across testbeds. An ID4IoT system 200, as described and proven herein, may advantageously enable the identification of wireless IoT protocol devices in a cost-effective way. Considering the current and future penetration of BLE as a widely used IoT communication protocol, embodiments of the present invention hold promise in advantageously enabling a more secure IoT cyberspace.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. An Internet of Things (IoT) device identification system comprising:
   at least one identification server having a processor and a memory including a training subsystem;
   a plurality of machine-learning (ML) classification algorithms stored on the memory;
   a plurality of filters located on the memory;
   a server input interface configured to receive a training label associated with an IoT device and a training dataset comprising a plurality of training wireless IoT packets associated with the IoT device;
   a selection subsystem configured to use the training dataset and, based on the training dataset, then select a classifier from the plurality of machine-learning (ML) classification algorithms and to select, based on the training dataset, a filter from a plurality of filters;
   a filter subsystem configured to use the selected filter to filter the training dataset to define a filtered training data set;
   a training feature vector determining subsystem configured to calculate a first inter-arrival-time (IAT) associated with the filtered training data set, to calculate a first density distribution for the first IAT associated with the filtered training data set, and to convert the first density distribution to the training feature vector; and
   a prediction model determining subsystem configured to predict a model associated with the IoT device using the training feature vector and the selected classifier.

2. The system according to claim 1 comprising a testing subsystem configured to receive a testing dataset comprising a plurality of testing wireless IoT packets, and configured to retrieve the prediction model and the selected filter;
   wherein the filter subsystem is configured to use the selected filter to filter the testing dataset to define a filtered testing data set;
   a testing feature vector determining subsystem configured to calculate a second inter-arrival-time (IAT) associated with the filtered testing data set, to calculate a second density distribution for the second IAT associated with the filtered testing data set, and to convert the second density distribution to the testing feature vector; and
   wherein the prediction model determining subsystem is configured to predict a model associated with the IoT device using the testing feature vector and, wherein upon detecting a prediction match, the prediction model determining subsystem outputs a predicted IoT device.

3. The system according to claim 1 wherein the plurality of ML classification algorithms is at least one of
   a function type selected from the group comprising at least one of Support Vector Machine, Multilayer Perception, Neural Network, Sequential Minimal Optimization (SMO), Artificial Neural Network (ANN), and Simple Logistic,
   a Bayes type selected from the group consisting of Bayes Net, Naïve Bayes, Naïve Bayes Multinomial Updateable, and Naïve Bayes Updateable,
   a rules type selected from the group consisting of Decision Table, K-Nearest Neighbor, JRip, OneR, and PART, and
   a trees type selected from the group consisting of Random Forest, Random Tree, Decision Stump, HoeffdingTree, J48, and LMT REPTree.

4. The system according to claim 1 wherein the selection subsystem is configured to:
   generate a performance list comprising an indication of accuracy for each possible pairwise combination of the plurality of ML classification algorithms and the plurality of filters;
   generate a best-performing list, defined as a subset of the possible pairwise combinations of the plurality of ML classification algorithms and the plurality of filters sorted by their respective accuracies in the performance list,
   assign as the selected classifier, one of the ML classification algorithms characterized as most frequent classifier in the best-performing list; and
   assign as the selected filter, one of the filters characterized as most frequent filter in the best-performing list.

5. The system according to claim 4 wherein the selection subsystem is configured to generate the performance list by performing a 10-fold cross validation of the respective accuracies for each possible combination of the plurality of ML classification algorithms and the plurality of filters.

6. The system according to claim 4 wherein the best-performing list further comprises a top 15 percent of the possible combinations of the plurality of ML classification algorithms and the plurality of filters characterized by the highest respective accuracies in the performance list.

7. The system according to claim 1 wherein the training feature vector determining subsystem is configured to convert the first density distribution into a histogram, and wherein each of at least one bin height in the histogram represents a respective feature in the training feature vector.

8. The system according to claim 1 wherein the IoT device is of a peripheral mode type and comprises one of a fitness band, a heart rate monitor, and a bike-mounted stride sensor.

9. The system according to claim 1 wherein the IoT device of a central mode type and comprises one of a smart watch, a smart phone, and a smart tablet.

10. The system according to claim 1 wherein the plurality of training wireless IoT packets is of one of an ATT-protocol type configured to transfer user data and an LELL-protocol type configured to transfer control data.

11. A method of fingerprinting an Internet of Things (IoT) device, the method comprising:
receiving a training label associated with the IoT device and a training dataset comprising a plurality of training wireless IoT packets associated with the IoT device;
selecting, using the training dataset, a selected classifier from a plurality of machine-learning (ML) classification algorithms and a selected filter from a plurality of filters;
filtering, using the selected filter, the training dataset, to define a filtered training data set;
determining a training feature vector by
calculating a first inter-arrival-time (IAT) associated with the filtered training data set,
calculating a first density distribution for the first IAT associated with the filtered training data set, and
converting the first density distribution to the training feature vector; and
determining a prediction model associated with the IoT device using the training feature vector and the selected classifier.

12. The method according to claim 11 further comprising:
receiving a testing dataset comprising a plurality of testing wireless IoT packets;
retrieving the prediction model and the selected filter;
applying the selected filter to the testing wireless IoT packet of the testing dataset;
filtering, using the selected filter, the testing dataset, to define a filtered testing data set;
determining a testing feature vector by
calculating a second inter-arrival-time (IAT) associated with the filtered testing data set,
calculating a second density distribution for the second IAT associated with the filtered testing data set, and
converting the second density distribution to the testing feature vector; and
applying the prediction model using the testing feature vector; and
detecting a prediction match using the prediction model and outputting a predicted IoT device.

13. The method according to claim 11 wherein the plurality of ML classification algorithms is of at least one of
a function type selected from the group consisting of Support Vector Machine, Multilayer Perception, Neural Network, Sequential Minimal Optimization (SMO), Artificial Neural Network (ANN), and Simple Logistic,
a Bayes type selected from the group consisting of Bayes Net, Naïve Bayes, Naïve Bayes Multinomial Updateable, and Naïve Bayes Updateable,
a rules type selected from the group consisting of Decision Table, K-Nearest Neighbor, JRip, OneR, and PART, and
a trees type selected from the group consisting of Random Forest, Random Tree, Decision Stump, HoeffdingTree, J48, and LMT REPTree.

14. The method according to claim 11 wherein selecting the selected classifier and the selected filter further comprises:
selecting a performance list comprising a respective accuracy for each possible pairwise combination of the plurality of ML classification algorithms and the plurality of filters;
selecting a best-performing list, defined as a subset of the possible pairwise combinations of the plurality of ML classification algorithms and the plurality of filters sorted by their respective accuracies in the performance list;
determining the selected classifier, defined as one of the ML classification algorithms characterized as most frequent classifier in the best-performing list; and
determining the selected filter, defined as one of the filters characterized as most frequent filter in the best-performing list.

15. The method according to claim 14 wherein computing the performance list further comprises computing 10-fold cross validation of the respective accuracies for each possible combination of the plurality of ML classification algorithms and the plurality of filters.

16. The method according to claim 14 wherein the best-performing list further comprises a top 15 percent of the possible combinations of the plurality of ML classification algorithms and the plurality of filters characterized by the highest respective accuracies in the performance list.

17. The method according to claim 11 wherein determining the training feature vector further comprises converting the first density distribution into a histogram, wherein each of at least one bin height in the histogram represents a respective feature in the training feature vector.

18. The method according to claim 11 wherein the IoT device is of a peripheral mode type and comprises one of a fitness band, a heart rate monitor, and a bike-mounted stride sensor.

19. The method according to claim 11 wherein the IoT device is of a central mode type and comprises one of a smart watch, a smart phone, and a smart tablet.

20. The method according to claim 11 wherein the plurality of training wireless IoT packets is of one of an ATT-protocol type configured to transfer user data and an LELL-protocol type configured to transfer control data.

* * * * *